/

US009187656B2

(12) United States Patent
Herlihy et al.

(10) Patent No.: US 9,187,656 B2
(45) Date of Patent: Nov. 17, 2015

(54) MODIFIED POLYAMIDE ACRYLATE OLIGOMERS

(75) Inventors: Shaun Lawrence Herlihy, Chatham (GB); Sean Philip Francis Mayers, Maidstone (GB)

(73) Assignee: Sun Chemical Corporation, Parsippany, NJ (US)

( * ) Notice: Subject to any disclaimer, the term of this patent is extended or adjusted under 35 U.S.C. 154(b) by 608 days.

(21) Appl. No.: 13/320,200

(22) PCT Filed: May 12, 2010

(86) PCT No.: PCT/GB2010/000955
§ 371 (c)(1),
(2), (4) Date: Dec. 1, 2011

(87) PCT Pub. No.: WO2010/130996
PCT Pub. Date: Nov. 18, 2010

(65) Prior Publication Data
US 2012/0076994 A1 Mar. 29, 2012

Related U.S. Application Data

(60) Provisional application No. 61/177,785, filed on May 13, 2009, provisional application No. 61/177,758, filed on May 13, 2009.

(51) Int. Cl.
*B05D 5/00* (2006.01)
*B41M 3/10* (2006.01)
(Continued)

(52) U.S. Cl.
CPC .............. *C09D 11/101* (2013.01); *B05D 3/067* (2013.01); *B41M 5/5272* (2013.01); *B41M 7/0081* (2013.01); *C08F 2/46* (2013.01); *C08F 2/50* (2013.01); *C08F 8/00* (2013.01); *C08F 8/32* (2013.01); *C08F 222/38* (2013.01); *C08F 283/04* (2013.01); *C08G 59/12* (2013.01); *C08G 59/14* (2013.01); *C08G 59/1494* (2013.01); *C08G 63/47* (2013.01); *C08G 63/48* (2013.01); *C08G 63/685* (2013.01); *C08G 63/91* (2013.01); *C08G 69/26* (2013.01); *C08G 69/34* (2013.01); *C08G 69/44* (2013.01); *C08G 69/46* (2013.01); *C08K 3/04* (2013.01); *C08K 5/00* (2013.01); *C08K 5/23* (2013.01); *C08L 63/00* (2013.01); *C08L 63/04* (2013.01); *C08L 63/10* (2013.01); *C08L 67/07* (2013.01); *C08L 67/08* (2013.01); *C08L 77/06* (2013.01); *C08L 77/08* (2013.01); *C08L 77/12* (2013.01); *C09D 5/00* (2013.01); *C09D 11/00* (2013.01); *C09D 11/10* (2013.01); *C09D 11/104* (2013.01); *C09D 163/04* (2013.01); *C09D 163/10* (2013.01); *C09D 167/07* (2013.01); *C09D 167/08* (2013.01);
(Continued)

(58) Field of Classification Search
CPC ................ C08F 2/46; C08F 2/50; C08F 8/00; C08F 8/32; C08F 222/38; C08F 283/04; C08G 59/12; C08G 59/14; C08G 59/1494; C08G 63/47; C08G 63/48; C08G 63/685; C08G 63/91; C08G 69/26; C08G 69/34; C08G 69/44; C08G 69/46; C08K 3/04; C08K 5/00; C08K 5/23; C08L 63/04; C08L 63/00; C08L 63/10; C08L 67/07; C08L 67/08; C08L 77/06; C08L 77/08; C08L 77/12; C09D 5/00; C09D 11/00; C09D 11/10; C09D 11/101; C09D 11/104; C09D 163/04; C09D 163/10; C09D 167/07; C09D 167/08; C09D 177/12; C09J 163/04; C09J 163/10; C09J 167/07; C09J 167/08; C09J 177/12; B05D 3/067; B05D 2505/00; B05D 2601/02; B41M 5/5272; B41M 7/0081; Y10T 428/24802; Y10T 428/42934
USPC ............... 522/6, 78, 100, 103, 164, 167, 170, 522/186; 523/160, 161; 524/190, 495, 496, 524/538, 548, 555, 556, 595, 602, 611, 612, 524/715, 850, 854, 876, 879; 525/54.4, 525/149, 181, 421, 484, 420.5; 527/603; 528/103.5, 111.3, 113, 118, 119
See application file for complete search history.

(56) References Cited

U.S. PATENT DOCUMENTS

| 6,645,341 | B1 | 11/2003 | Gordon | |
|---|---|---|---|---|
| 2007/0120921 | A1* | 5/2007 | Carlini et al. | 347/100 |
| 2008/0221234 | A1* | 9/2008 | Illsley et al. | 522/88 |

FOREIGN PATENT DOCUMENTS

| DE | 10 2007 032689 | 1/2008 |
|---|---|---|
| WO | WO 02/04552 | 1/2002 |

(Continued)

OTHER PUBLICATIONS

Braithwaite, M. et al., "Chemistry & Technology of UV & EB Formulation for Coatings, Inks & Paints." vol. IV; Formulation; 1991; pp. 342-344; ISBN 0 94779821 8.
Leach, Dr. R. H. et al. (Ed.), "The Printing Ink Manual." Fourth Edition, 1988 Society of British Printing Ink Manufactures Ltd.; pp. 537-538; ISBN0-7476-0000-7.
"Thermoset Vs. Thermoplastic Materials: Polymer properties are linked to heat-induced changes"; downloaded on Jan. 6, 2015 from http://www.rlhudson.com/publications/techfiles/thermo.htm.

*Primary Examiner* — Patrick Niland
(74) *Attorney, Agent, or Firm* — Charles C. Achkar; Ostrolenk Faber LLP

(57) ABSTRACT

A liquid resin, which is the Michael addition product of an amine-terminated aminoamide thermoplastic polymer with one or more polyol ester compounds having at least one (meth)acrylate group, wherein the amine-terminated aminoamide thermoplastic polymer contains a bisphenol or novolac segment to provide increased hardness and improved flow of radiation-curable compositions incorporating such resins, methods of printing using such compositions and articles printed with such compositions.

31 Claims, No Drawings

(51) Int. Cl.

| | | |
|---|---|---|
| *B41M 5/00* | (2006.01) | |
| *C08F 2/46* | (2006.01) | |
| *C08F 2/50* | (2006.01) | |
| *C08F 8/00* | (2006.01) | |
| *C08F 8/30* | (2006.01) | |
| *C08F 222/40* | (2006.01) | |
| *C08F 283/04* | (2006.01) | |
| *C08G 8/34* | (2006.01) | |
| *C08G 59/42* | (2006.01) | |
| *C08G 63/48* | (2006.01) | |
| *C08G 63/91* | (2006.01) | |
| *C08G 69/26* | (2006.01) | |
| *C08G 69/44* | (2006.01) | |
| *C08G 73/10* | (2006.01) | |
| *C08K 3/04* | (2006.01) | |
| *C08K 5/23* | (2006.01) | |
| *C08L 61/04* | (2006.01) | |
| *C08L 69/00* | (2006.01) | |
| *C08L 71/12* | (2006.01) | |
| *C08L 77/00* | (2006.01) | |
| *C08L 79/00* | (2006.01) | |
| *C09D 5/00* | (2006.01) | |
| *C09D 11/00* | (2014.01) | |
| *C09D 11/10* | (2014.01) | |
| *C09D 11/101* | (2014.01) | |
| *B41M 5/52* | (2006.01) | |
| *B41M 7/00* | (2006.01) | |
| *B05D 3/06* | (2006.01) | |
| *C08G 59/12* | (2006.01) | |
| *C08F 8/32* | (2006.01) | |
| *C08G 59/14* | (2006.01) | |
| *C08G 63/47* | (2006.01) | |
| *C08F 222/38* | (2006.01) | |
| *C08G 69/46* | (2006.01) | |
| *C08G 63/685* | (2006.01) | |
| *C08G 69/34* | (2006.01) | |
| *C09D 163/10* | (2006.01) | |
| *C08L 77/08* | (2006.01) | |
| *C09D 163/04* | (2006.01) | |
| *C08L 77/06* | (2006.01) | |
| *C08L 77/12* | (2006.01) | |
| *C09J 167/08* | (2006.01) | |
| *C09J 163/10* | (2006.01) | |
| *C09D 167/08* | (2006.01) | |
| *C08L 67/08* | (2006.01) | |
| *C08L 63/10* | (2006.01) | |
| *C09D 177/12* | (2006.01) | |
| *C08L 63/00* | (2006.01) | |
| *C09J 167/07* | (2006.01) | |
| *C08L 67/07* | (2006.01) | |
| *C09D 167/07* | (2006.01) | |
| *C09J 163/04* | (2006.01) | |
| *C09D 11/104* | (2014.01) | |
| *C08L 63/04* | (2006.01) | |
| *C09J 177/12* | (2006.01) | |
| *C08K 5/00* | (2006.01) | |

(52) U.S. Cl.
CPC ............. *C09D 177/12* (2013.01); *C09J 163/04* (2013.01); *C09J 163/10* (2013.01); *C09J 167/07* (2013.01); *C09J 167/08* (2013.01); *C09J 177/12* (2013.01); *B05D 2505/00* (2013.01); *B05D 2601/02* (2013.01); *Y10T 428/24802* (2015.01); *Y10T 428/24934* (2015.01)

(56) References Cited

FOREIGN PATENT DOCUMENTS

| WO | WO 02/18479 | 3/2002 |
| WO | WO 2004/046214 | 6/2004 |
| WO | WO 2007/043496 | 4/2007 |

\* cited by examiner

MODIFIED POLYAMIDE ACRYLATE OLIGOMERS

This application is a 35 U.S.C. §371 National Stage Entry of International Application No. PCT/GB2010/000955, filed May 12, 2010, which claims priority to U.S. Provisional Application Nos. 61/177,785, and 61/177,758, both of which were filed on May 13, 2009, all of which hereby are incorporated by reference in their entirety for all purposes as if fully set forth herein.

FIELD OF THE INVENTION

The present invention relates to a series of new acrylate-modified polyamide resins and provides processes for their preparation and methods and compositions using them, especially for use in printing inks, and particularly for inks printable by offset lithography.

BACKGROUND

*Cyclic compounds from the reaction of bisphenol A diglycidyl ether with amines*, O Svein, O G Tjugum; *Acta Chemica Scandinavica* (1970), 24(7), 2397-23404 describes a small cyclic molecule, which contains no terminal secondary amine groups and is not acrylate functional.

WO 97/38022 (Henkel) Radiation curable rheology modifiers, describes a composition which contains both acrylate functional epoxy compounds and a polyamide resin. The polyamide resin is derived from dimer acid that is not terminally acid or amine functional and therefore takes no part in the reaction with the epoxy compound. The end result is a physical blend of an epoxy acrylate and a thermoplastic polyamide resin.

WO 2007/030643 (Sun Chemical) Acrylated polyamide containing printing inks, discloses printing inks containing an acrylate modified amino amide resin which is the Michael addition product of an acrylate monomer and an amino amide polymer. The amine terminated amino amide polymer intermediate is the reaction product of dimer acid and piperazine with 1-25% of a monofunctional fatty acid that reduces the molecular weight and tendency of the polymer to cause ink misting.

WO 2006/067639 (Sun Chemical) Acrylated polyamides, their preparation and use, discloses a radiation-curable acrylate modified amino amide resin which is the reaction product of an acrylate monomer and an amine terminated amino amide polymer made from dimer acid and piperazine.

WO 03/028992 (Cognis) Radiation curable compositions with enhanced adhesion, describes compositions where the polymer is an amine terminated polyamide based on dimer acid and a difunctional amine which is subsequently acrylated by a monomer using the Michael addition reaction. The monomer itself is typically the reaction product of butane diol diglycidyl ether with acrylic acid. The use of diglycidyl ether compounds in this invention is only as a reactant with acrylic acid and the epoxy groups do not directly react with the amine group of the polyamide resin.

US 2007/0142492 (XEROX Corp.) Radiation curable inks, describes the use of a curable epoxy polyamide composite gellant based on the reaction of a bisphenol A diglycidyl ether resin with a polyether polyamide and lauric acid. In this case, the polyether polyamide materials being used are acid functional, giving an epoxy terminated polymer gellant which is acrylated using acrylic acid.

EP 0 381 354 (Union Camp) Radiation curable amino amide acrylate polymers, discloses a method for bonding based on the use of an acrylate modified amino amide resin. The amine terminated thermoplastic polymer intermediate is a reaction product of dimer acid and a difunctional amine. This intermediate is reacted with an acrylate monomer to give an acrylate functional product.

U.S. Pat. No. 5,952,071 (Raychem) Curable adhesive system, discloses a two component curable adhesive comprising such as bisphenol A diglycidyl ether or an epoxy novolac reacted with an amine terminal polyamide resin. No acrylate chemistry or UV drying process is involved in this invention.

U.S. Pat. No. 6,316,517 (Cognis) Radiation polymerisable composition, flushing and grinding vehicle containing same, describes a formulation including a rheology modifying (RM) resin whereby, as quoted at column 5, lines 56 to 60: "The RM resins listed above comprise the reaction product of a diepoxide and an acid component which includes an ethylenically unsaturated carboxylic acid or reactive derivatives thereof reacted in the presence of a polyamide derived from a polymerised fatty acid.". There is no disclosure of the formation of an amine-terminated aminoamide thermoplastic polymer nor the reaction product of reacting such an of such an amine-terminated aminoamide thermoplastic polymer with a polyol ester having at least one (meth)acrylate group.

U.S. Pat. No. 5,424,371 (Union Camp) Adhesive of amine terminated piperazine containing polyamide and epoxy resin, describes a two component curable adhesive composition comprising an epoxy compound such as an epoxy novolac and an amine terminated polyamide resin. No acrylate chemistry or UV drying process is involved in this invention.

SUMMARY OF THE INVENTION

Polyamide acrylate oligomers are useful as a radiation-curable resins in many types of ink and coating compositions, such as printing inks, varnishes and the like. It has now been discovered that the incorporation of a hard aromatic segment into an acrylated aminoamide resin not only improves the hardness and cure speed of the ink, coating or adhesive compositions comprising such a resins, but also the pigment wetting ability and ink flow properties, especially with yellow and black pigments.

In a first aspect, the invention provides a resin, which is the Michael addition product of an amine-terminated aminoamide thermoplastic polymer with one or more polyol ester compounds having at least one acrylate group, wherein the amine-terminated aminoamide thermoplastic polymer contains a bisphenol or novolac segment and wherein the resin is liquid at 25° C. In one embodiment, the resin of the first aspect of the invention is a radiation-curable resin, for example, for use as a reactive component of a ink, coating or adhesive composition. In another embodiment the resin is a non-reactive, passive resin, for example, for use as a dispersant or flow aid in an ink, coating or adhesive composition.

In a second aspect, the invention provides a radiation-curable composition comprising the resin of the first aspect of the invention and optionally a photoinitiator. In a further aspect, the radiation-curable composition of the invention is an ink, coating or adhesive composition.

In a third aspect, the invention provides a yellow or black radiation-curable printing ink or coating composition comprising polyamide acrylate oligomer, wherein when about 1 cm³ of the composition is placed on a perpendicular metal flow plate at about 25° C., the furthest distance flowed by the composition after 15 minutes is at least about 3 cm.

In a fourth aspect of the invention there is provided a printed or coated article comprising a cured film of a radiation-curable ink or coating composition of the second or third aspects of the invention.

In a fifth aspect, the invention provides a method of printing or coating an article comprising the steps of applying a radiation-curable ink or coating composition of the second or third aspects of the invention on to the article and exposing the ink or coating composition to radiation to form a cured film or image.

In a sixth aspect the invention provides a method of preparing the resin of the first aspect of the invention, comprising the steps of: providing the amine-terminated aminoamide thermoplastic polymer; and reacting the amine-terminated aminoamide thermoplastic polymer with one or more polyol ester compounds having at least one acrylate group.

In a seventh aspect, the invention provide a method of adhering a first article to a second article comprising the steps of applying a layer of an adhesive composition of the second aspect of the invention to the first article, contacting the layer with the second article and curing the composition.

In a eighth aspect, the invention provides an object comprising a first article adhered to a second article by a layer of adhesive comprising the resin of the first aspect of the invention and/or a layer of a radiation-curable adhesive composition of the second aspect of the invention.

The resins disclosed in WO 2006/067639 and WO 2007/030643 are not particularly fast curing because of their inherent soft nature. When those resins are used to make offset printing inks, the resulting inks typically have poor pigment wetting ability and ink flow properties with most pigments. The present invention describes a modification of the compounds disclosed in those documents to incorporate a hard aromatic segment to improve the hardness and cure speed. The incorporation of an aromatic segment has been found to provide the further added and surprising benefit of greatly enhancing ink flow properties. In addition, the compounds described in the prior art are difficult to use in conjunction with some monomers, particularly ethoxylated monomers like ethoxylated pentaerythritol tetraacrylate, due to extreme incompatibility. A surprising further aspect of this invention is the use of epoxidised soya bean oil acrylate in conjunction with these ethoxylated monomers to render them fully compatible.

The vast majority of oligomers for use in UV curing offset inks are either polyester, epoxy or urethane acrylates. Of these, polyester acrylates are preferred due to better pigment wetting, ink flow and lithographic behaviour. Epoxy acrylates and modified epoxy acrylates tend to be the lowest cost but rarely have good lithographic behaviour, pigment wetting or ink flow properties. Urethane acrylates tend to be the most expensive and are not so commonly used.

The oligomers of this invention have been shown to give excellent lithographic, pigment wetting, ink flow properties and cure. They are simple to make using low-cost raw materials with the involvement of no catalysts. As such, they give rise to products that are high functionality with few residues and are particularly suited to offset inks applications for food packaging requiring low migration.

The materials described in WO 2006/067639, WO 2007/030643, WO 03/028992 and EP 0 381 354 are typically based on dimer acid and piperazine which are relatively soft once cured. The incorporation of a "hard" novolac or bisphenol groups, within the backbone of the polymer substantially improves both the ink flow properties and hardness of the cured film. Furthermore the use of epoxidised soybean oil acrylate monomer in the final stage gives much improved compatibility of the final product towards ethoxylated monomers. The improvement in ink flow properties is particularly surprising as it is well known by those skilled in the art that epoxy acrylate oligomers tend to have poor pigment wetting and flow properties unless they are modified with fatty acids, and the modification of a material with inherently poor flow with an aromatic epoxy compound would certainly not be expected to increase the flow.

DETAILED DESCRIPTION OF THE INVENTION

A radiation-curable resin is a resin including groups that react with polymerisable monomers and other components comprising polymerisable groups during curing of radiation-curable compositions. Polymerisable groups advantageously crosslink with polymerisable groups on other molecules during curing reactions thereby hardening the composition. Preferably, the radiation-curable resins of the invention are free radical-curable resins. A free radical-curable resin for use in radiation-curable composition that is curable in a free radical polymerisation process is a resin that includes ethylenically unsaturated groups or other groups that participate in free radical curing reactions. Preferably, the radiation-curable resins of the first aspect of the invention include at least one (meth)acrylate or other ethylenically unsaturated group.

Passive resins are resins that are inert resins, especially inert thermoplastic resins, that do not react with the polymerisable monomers during curing of radiation-curable compositions. A passive resin is substantially free of functional groups which polymerise under the curing conditions to which the radiation-curable composition is exposed. For example, a passive resin for use in radiation-curable composition that is curable in a free radical polymerisation process is a resin that is free of ethylenically unsaturated groups or other groups that participate in free radical curing reactions. In one embodiment, the resin of the first aspect of the invention is a passive resin. The passive resin of the invention may, for example be useful as a flow aid and/or dispersant in an energy-curable composition. In one embodiment, the passive resin of the invention is the Michael addition product of an amine-terminated aminoamide thermoplastic polymer with one or more polyol ester compounds having a single acrylate group. Alternatively the passive resin of the invention is the Michael addition product of an amine-terminated aminoamide thermoplastic polymer with one or more polyol ester compounds having more than one acrylate group, wherein unreacted elylenically unsaturated groups remaining in the reaction product thus obtained are subsequently reacted with an additional reagent, such as an amine. Preferably, the inert resins of the first aspect of the invention are substantially free of (meth)acrylate or other ethylenically unsaturated groups.

The resin of the invention is, for example, a compound having a novolac or bisphenol segment as a central head group or core from which a plurality of polyamide chains extend that terminate in a unit derived from a polyol ester that includes at least one (meth)acrylate group. In one embodiment, the structure of the resin of the invention could be represented schematically as:

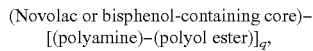

wherein q is at least 2. Preferably, the unit derived from a polyol ester itself comprises at least one, advantageously two or more, (meth)acrylate functional groups. The novolac or bisphenol segments are advantageously linked to the polyamide chains via a linker derived from an epoxy group, for example, following the reaction of an epoxy group in an epoxylated novolac or bisphenol with an amine group. Advantageously, said amine group is, or will, become a terminal amine group of an aminoamide chain. The amine-terminated aminoamide thermoplastic polymer including the Novolac or bisphenol-containing core is advantageously linked to a polyol ester head group by a new nitrogen to carbon bond formed in the Michael addition reaction between the nitrogen atom of a amine group in the amine-terminated aminoamide thermoplastic polymer and a terminal sp² hybridised carbon atom an ethylinically unsaturated group in the polyol ester. For example, the N—C bond in the group: N—CH₂—C(R)—C(O)—O—, in which R is hydrogen or methyl, formed in the Michael addition of a terminal secondary amine group with a (meth)acrylate group.

The term "(meth)acrylate" is used herein to mean acrylate or methacrylate or a mixture thereof.

The term "bisphenol segment" as used herein refers to a segment of the resin including at least one methylenediphenol unit incorporated in polyamide. The bisphenol segment is typically an oxygen-linked divalent radical derived from a bisphenol compound, for example, the divalent radical obtained following loss of a hydrogen atom on each of the two phenol hydroxyl groups. The bisphenol segment may include more than one methylenediphenol unit, for example, linked via a linker group such as —CH—CH(OH)—CH₂—. Bisphenols are methylenediphenol compounds, wherein the methylene carbon atom and the carbon atoms on the phenyl rings are each optionally substituted with one or more substituents, which are typically $C_{1-4}$ alkyl groups. Commercially available bisphenols include Bisphenol A (4,4'-isopropylidenediphenol, systematic name 2,2-Bis(4-hydroxyphenyl)propane), Bisphenol B (4,4"-(1-methylpropylidene)diphenol, systematic name 2,2-bis(4-hydroxyphenyl)butane), Bisphenol C (4,4"-isopropylidenedi-2-methylphenol, systematic name 2,2-bis(3-methyl-4-hydroxyphenyl)propane), Bisphenol E (4,4'-ethylidenediphenol systematic name 1,1-bis(4-hydroxyphenyl)ethane), Bisphenol F (4,4'-methylenediphenol, systematic name bis(4-hydroxydiphenyl)methane) and bisphenol G (4,4'-(1-methylpropylidene)di(2-isopropyl) phenol, systematic name 2,2-bis(4-hydroxy-3-isopropylphenyl)propane). Bisphenol compounds in which the methylene linker is unsubstituted, such as Bisphenol F, have been found to provide resins with particularly advantageous flow properties. The bisphenol segment present in the amine-terminated aminoamide thermoplastic polymers of the invention are preferably 4,4'-methylenediphenoxy radicals, wherein the methylene carbon atom and the carbon atoms on the phenyl rings are each optionally substituted with one or more $C_{1-4}$ alkyl groups. Preferably, the methylene carbon atom is unsubstituted. In one embodiment the bisphenol segment is a divalent radical of the formula:

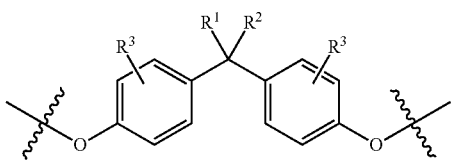

wherein $R^1$, $R^2$ and $R^3$ are each independently selected from hydrogen and $C_{1-4}$ alkyl. Advantageously, $R^1$ and $R^2$ are both hydrogen and each $R^3$ is independently selected from hydrogen and $C_{1-4}$ alkyl, for example, hydrogen and methyl. Preferably, at least two out of the four $R^3$ groups on each phenyl ring are hydrogen. In one embodiment the bisphenol segment is derived from Bisphenol A, Bisphenol B, Bisphenol E, Bisphenol F or Bisphenol G, preferably Bisphenol A or Bisphenol F, especially Bisphenol F.

The term "novolac segment" as used herein refers to a phenol-(methylene-phenol)$_n$ unit, such as a methylenediphenol unit, incorporated in polyamide. The novolac segment is typically an oxygen-linked multivalent radical derived from a novolac resin, for example, the multivalent radical obtained following loss of a hydrogen atom on the two or more of the phenol hydroxyl groups of a novolac resin. A novolac resin is a type of phenol-formadehyde resin comprising phenol groups linked by methylene linkers wherein the methylene carbon atoms on the phenyl rings are each optionally substituted with one or more substituents, which are typically $C_{1-4}$ alkyl groups. Novolac resins are terminated at either end by a phenol group and are typically formed from the reaction of formaldehyde with a slight molar excess of phenol. Examples of novolac resins include unsubstituted phenol-formadehyde resins (typically referred to as novolac resins) and cresol Novolac resins in which the phenol group is substituted with one methyl substituent. Novolac resins typically have number average molecular weights of from about 2,000 to about 10,000, and/or typically have from about 10 to about 20 phenol units. The novolac moiety present in the amine-terminated aminoamide thermoplastic polymers of the invention are, for example, multivalent phenoxy-(methylenediphenoxy)$_n$-methylenediphenoxy radicals, wherein the n is 0 or from 1 to 20 and wherein the methylene carbon atom and the carbon atoms on the phenyl rings are each optionally substituted with one or more $C_{1-4}$ alkyl groups. Preferably, the methylene linker is unsubstituted. The incorporation of novolac moieties in which the methylene linker is unsubstituted into acrylated polamide resins, have been found to provide resins with particularly advantageous flow properties. In one embodiment the novolac segment is a multivalent radical of the formula:

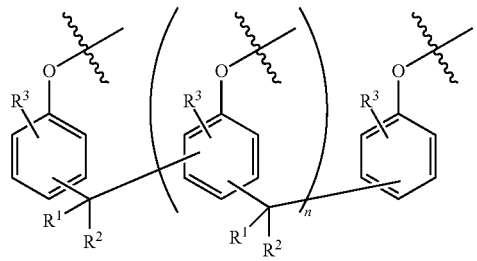

wherein $R^1$, $R^2$ and $R^3$ are each independently selected from hydrogen and $C_{1-4}$ alkyl. Advantageously, $R^1$ and $R^2$ are both hydrogen and each $R^3$ is independently selected from hydrogen and $C_{1-4}$ alkyl, for example, hydrogen and methyl.

The term "unsubstituted" as used herein refers to an atom or group that does not include any substituents other than hydrogen. For example, a methylene linker in which the carbon atom is unsubstituted refers to a —CH₂— unit. Unless otherwise specified, alkylenes, such as methylene, are unsubstituted.

In one embodiment, the resin of the first aspect of the invention comprises a compound of the formula (Ia):

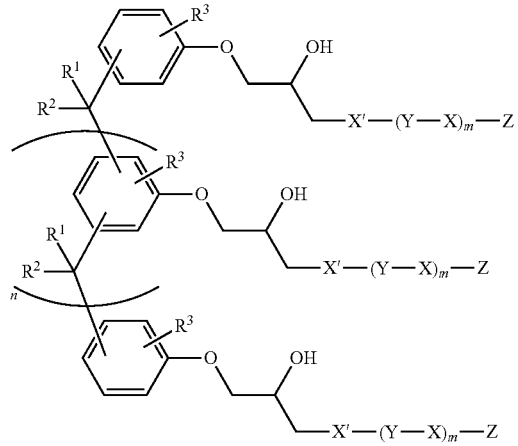

(Ia)

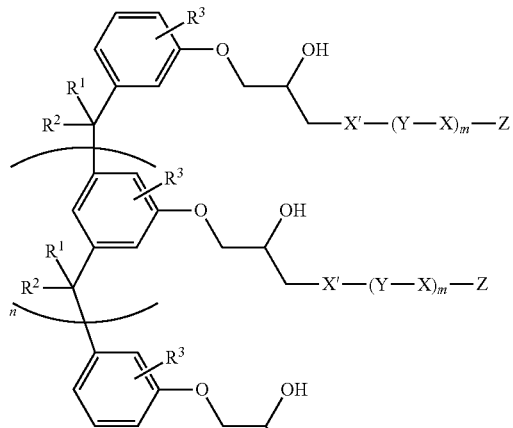

(I)

wherein X', (Y—X), X, Y, Z, m, n, R$^1$, R$^2$ and R$^3$ are as defined for compounds of the formula (Ia) above.

In one embodiment, the resin of the first aspect invention comprises a compound of the formula (II):

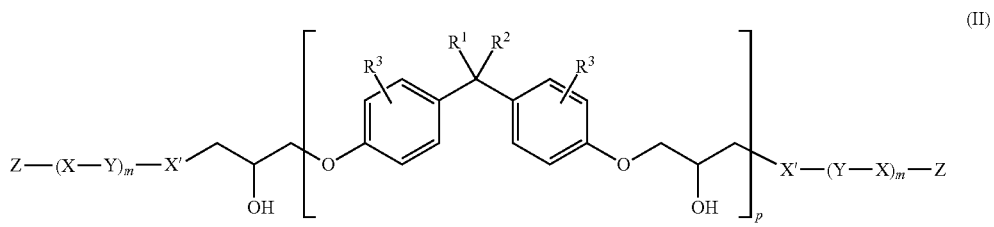

(II)

wherein X' is a unit derived from a diamine; (Y—X) is a polyamide, in which X is a unit derived from a diamine and Y is a unit derived from a dicarboxylic acid, wherein X and X' may be the same or different; Z is a unit derived from a polyol ester including at least one acrylate group; each m is independently in the range of from 0 to 10; R$^1$, R$^2$ and R$^3$ are each independently selected from hydrogen and C$_{1-5}$ alkyl (e.g. methyl); and n is 0 or from 1 to 20.

In a further embodiment, the resin comprises a compound of the formula (I):

wherein: X' is a unit derived from a diamine; (Y—X) is a polyamide, in which X is a unit derived from a diamine and Y is a unit derived from a dicarboxylic acid, wherein X and X' may be the same or different; Y is a unit derived from the dicarboxylic acid; Z is a unit derived from a polyol ester including at least one acrylate group; each m is independently in the range of from 0 to 10; R$^1$, R$^2$ and R$^3$ are each independently selected from hydrogen and methyl; and p is from 1 to 10.

In one embodiment, the resin comprises a compound of the formula (Ia) or (I), wherein n is from 0 to 2. In one embodiment, the radiation-curable resin of the invention comprises a compound of the formula (II) wherein p is from 1 to 6, for example, p is 1.

In one embodiment, the resin comprises a compound of the formula (Ia), (I) or (II), wherein $R^1$ and $R^2$ are both hydrogen. In one embodiment, the radiation-curable resin comprises a compound of the formula (Ia), (I) or (II), wherein $R^3$ is hydrogen. In one embodiment the resin comprises a compound of the formula (Ia), (I) or (II), wherein at least two out of the four $R^3$ groups on each phenyl ring are hydrogen.

In one embodiment, the resin of the invention comprises a compound of the formula (Ia), (I) or (II), wherein X' is a unit derived from a secondary diamine and the X is selected from a unit derived from a secondary diamine and a primary diamine.

The term "diamine unit" as used herein refers to a unit derived from a diamine, which is, for example, the divalent radical obtained following loss of a hydrogen atom on each of two secondary or primary amine groups. For example, the divalent radical obtained following the reaction of an N—H functional group on each of two secondary or primary amine groups in the diamine in a Michael addition, a condensation reaction (e.g. with a carboxylic acid), or a nucleophilic addition to ring open an epoxide.

The term "dicarboxy unit" as used herein refers to a unit derived from a dicarboxylic acid or chemical equivalent, such as an acid chloride, which is, for example, the divalent radical obtained following loss of an hydroxyl functional group from each of two carboxylic acid groups. For example, the divalent radical obtained following a condensation reaction of each of two carboxylic acid or equivalent groups with a nucleophile, especially a condensation reaction with an N—H functional group.

In one embodiment, the unit derived from a polyol ester having at least one (meth)acrylate group is a monovalent radical group derived from a nucleophilic addition reaction across a ethylenically unsaturated function group present in the polyol ester. For example, following a Michael addition reaction of a (meth)acrylate functional group present in the polyol ester with an N—H functional group.

In one embodiment, the amine-terminated aminoamide thermoplastic polymer is the reaction product of: an epoxylated aromatic polyol; a difunctional carboxylic acid; one or more diamines; and optionally, a molecular weight limiting compound selected from a monofunctional $C_2$-$C_{22}$ acid, a monofunctional glycidyl ether or monofunctional amine.

Typically, the amine-terminated aminoamide thermoplastic polymer is prepared by combining the individual components and heating to an elevated temperature, for example, a temperature of about 80° C. or more, such as about 120° C., optionally with stirring. During this time the epoxy groups will react with the amine which is advantageously present in an excess. On increasing the temperature further, for example to a temperature of about 150° C. or more, such as about 190° C., the well-known condensation reaction between the carboxylic acid and amine takes place. Preferably the water formed is removed by distillation or via an azeotrope. The reaction is preferably done in the absence of any solvent but suitable solvents include aromatic hydrocarbons such as xylene, toluene etc., which would aid the removal of water via an azeotrope. There is no particular restriction on the reaction temperature: however, the reaction is preferably carried out at a temperature greater than 100° C. so as to remove the water formed during the reaction. The progress of the reaction may be monitored by the amine number and acid number, as is well-known in the art.

Typically, the amine-terminated aminoamide thermoplastic polymer has a weight average molecular weight of at least about 2000, for example at least about 3000, especially at least 4000. Typically, the amine-terminated aminoamide thermoplastic polymer has a weight average molecular weight of no more than 30000, for example no more than 20000, especially no more than 15000. In one embodiment, the amine-terminated aminoamide thermoplastic polymer has a weight average molecular weight of no more than 12000, for example no more than 10000, especially no more than 8000. Preferably, the amine-terminated aminoamide thermoplastic polymer has a weight average molecular weight of from about 4000 to about 7000.

The term "aromatic polyol" as used herein refers to an aromatic compound comprising one or more aryl rings and two or more hydroxyl groups. Examples of aromatic polyols include bisphenols and novolac resins. The term "epoxylated aromatic polyol" as used herein refers to an aromatic polyol wherein the hydroxyloxygen atoms are linked to a unit comprising an epoxide functional group. In one embodiment, the epoxylated aromatic polyol is the reaction product of an aromatic epoxide and a glycidyl ether. Examples of epoxylated aromatic polyols include epoxy novolac resins and diglycidyl ethers of bisphenol compounds. Diglycidyl ethers of bisphenol compounds are typically oligomerised, for example by an ring-opening addition reaction between the OH group on a phenol ring of a first bisphenol molecule and an epoxide group attached to another bisphenol molecule Diglycidyl ethers of bisphenol compounds typically include from 1 to 10 bisphenol units, especially from 1 to 6 bisphenol units. In one embodiment the epoxylated aromatic polyol used in the formation of the amine-terminated aminoamide thermoplastic polymer of the invention is selected from epoxy Novolac, epoxyl cresol Novolac, Bisphenol A diglycidyl ether and Bisphenol F diglycidyl ether. Advantageously, the epoxylated aromatic polyol used in the formation of the amine-terminated aminoamide thermoplastic polymer of the invention has a number average molecular weight of about 6000 or less.

In one embodiment, the epoxylated aromatic polyol is a compound of formula (IIIa) or (IIIb):

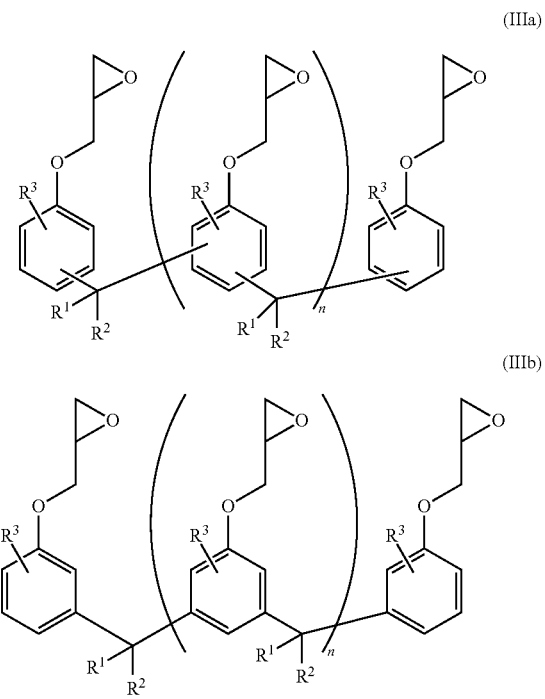

wherein n, $R^1$, $R^2$ and $R^3$ are as defined for compounds of the formula (I) above.

In a further embodiment, the aromatic epoxy polyol is a compound of formula (IV):

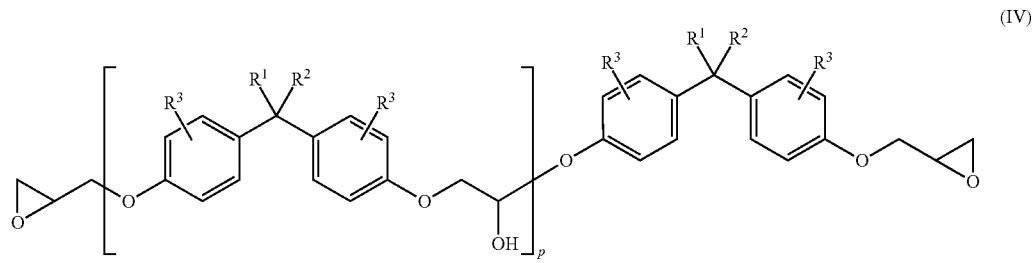

wherein p, $R^1$, $R^2$ and $R^3$ are as defined for compounds of the formula (II) above.

In general, the diamine is typically an aliphatic, cycloaliphatic or aromatic diamine having from 2 to 36 carbon atoms. Examples of such diamines which may be employed include: aliphatic diamines having from 1 to 36 carbon atoms, such as methylenediamine, ethylenediamine, trimethylenediamine, hexamethylenediamine, methylpentamethylenediamine and polyether diamines; aromatic diamines having from 6 to 20 carbon atoms, such as toluenediamine, p,p'-diaminodiphenylmethane, and xylenediamine; cycloaliphatic diamines, such as diaminocyclohexane; and heterocyclic diamines, such as piperazine, 4,4'-dipiperidinyl, and aminoethylpiperazine. Preferably, at least one of the one or more diamines is a secondary diamine. Preferred secondary diamines include piperazine. In one embodiment, the one or more multifunctional amines includes a primary diamine, such as ethylene diamine. The use of tri-, tetra- or higher functional amines is possible within limits, but will have a significant effect on both the molecular weight and the degree of branching of the polymer. Thus, tri- and higher amines are used in combination with one or more diamines and preferably in sufficiently small amounts as to prevent or minimise premature gelation. Examples of such polyamines include diethylenetriamine, triethylenetetramine, tetraethylenepentamine and bishexamethylenetriamine. As mentioned elsewhere, monofunctional amines can be included in the reaction mixture, for example as molecular weight limiting compounds. The amines can be aliphatic, aromatic or cycloaliphatic in nature.

In one embodiment, the difunctional carboxylic acid is a dimer acid. Dimer acid is, as is well known to those skilled in the field of resins, a polymeric fatty acid, or, more commonly, mixture of polymeric fatty acids, prepared by polymerisation of unsaturated fatty acids, commonly obtained from tall oil. Although the major part of such dimer acids is composed of one or more dibasic acids, they typically also contain small amounts of monobasic acids (for example, the material used in the Examples hereof typically contains about 0.2% monobasic fatty acids) and small amounts of tri- and higher basic acids. If desired, the polymerised product may be separated into its components, but, more usually, the mixture of acids obtained from the polymerisation is used, as is. Hydrogenated dimer acids may also be employed. Where the polymerised fatty acid contains monobasic acid, this is not counted towards the amount of mono functional $C_2$-$C_{22}$ acid used as a weight-limiting compound.

In embodiments in which the resin of the invention is a radiation-curable resin, then the unit derived from the polyol ester having at least one (meth)acrylate group advantageously includes at least one unreacted (meth)acrylate group, especially at least two unreacted (meth)acrylate groups. Said unreacted (meth)acrylate groups are advantageously able to participate in a curing reaction, in particular a free radical-curing reaction, in which composition comprising the resin of the invention is cured. For example, said (meth)acrylate group may react with other ethylenically unsaturated groups included in monomers present in the composition and/or crosslink with (meth)acrylate groups on other resin molecules. The polyol ester having at least one (meth)acrylate group advantageously has at least 2, especially at least 3, for example from 3 to 6 (meth)acrylate groups. In one embodiment, the polyol ester is an acrylate with a functionality of 3 or 4. In one embodiment, the polyol ester has at least three (meth)acrylate functional groups. Resins of the invention in which the unit derived from the polyol ester includes at least two unreacted (meth)acrylate groups have been found to be particularly advantageous for use as radiation-curable components in radiation-curable compositions as they provide radiation-curable compositions with good cure speeds and cured compositions. Compositions comprising resins in which the polyamide chains terminate in a group including only one unreacted (meth)acrylate group has been found to have slower cure speeds and a reduced hardness of the cured composition.

In one embodiment, the polyol ester is an acrylate or methacrylate of a $C_2$-$C_{20}$ aliphatic or cycloaliphatic polyol. The choice of polyol ester compound having at least one (meth)acrylate group used to produce the resin of the invention may be selected depending on the properties required in the final ink. For example, the choice of polyol ester may depend on whether the resin is for use in an adhesive or a flexo, screen, ink-jet or offset ink or coating. It has been found that the resins of the invention, and in particular resins in which polyol ester having at least one (meth)acrylate group is an epoxidised soya bean oil acrylate monomer, have good compatibility with ethoxylated monomers. Typically, the polyol ester is an acrylate or methacrylate of a $C_2$-$C_{20}$ aliphatic or cycloaliphatic polyol. Suitable multifunctional acrylate polyol esters include di- or trifunctional materials such as tripropylene glycol diacrylate or glycerol propoxylate triacrylate. Examples of suitable polyol esters include: tripropyleneglycol diacrylate, dipropyleneglycol diacrylate, diethyleneglycol diacrylate, propoxylated neopentylglycol diacrylate, diacrylates of polyethyleneglycol (e.g. PEG200 diacrylate), hexanediol diacrylate, glycerol triacrylate, glycerol trimethacrylate, sorbitol triacrylate, sorbitol trimethacrylate, trimethylolethane triacrylate, trimethylolethane trimethacrylate, trimethylolpropane triacrylate, dimethylolpropane tetraacrylate, dimethylolpropane tetramethacrylate, trimethylolpropane trimethacrylate, ethoxylated trimethylolpropane triacrylate, ethoxylated trimethylolpropane trimethacrylate, glycerol propoxylate triacrylate, glycerol propoxylate trimethacrylate, pentaerythritol triacrylate, pentaerythritol trimethacrylate, pentaerythritol tetraacrylate, pentaerythritol tetramethacrylate, dipentaerythritol hexaacrylate, dipentaerythritol hexamethacrylate, ethoxylated pentaerythritol tetraacrylate, propoxylated pentaerythritol tetraacrylate, sucrose pentaacrylate, sucrose pentamethacrylate, sucrose tetraacrylate, sucrose tetramethacrylate, sucrose triacrylate and sucrose trimethacrylate. Particularly suitable polyol ester compounds having at least one (meth)acrylate group include hexanediol diacrylate, tripropylene glycol diacrylate, dipropylene glycol diacrylate, propoxylated neopentyl glycol diacrylate, dianol diacrylate (which is the diacrylate of 2,2-bis[4-(2-hydroxyethoxy)phenyl]propane, e.g. Ebecryl 150 from UCB), glycerol propoxylate triacrylate, trimethylolpropane triacrylate, ethoxylated trimethylol propane triacrylate, propoxylated trimethylol propane triacrylate, pentaerythritol tetraacrylate, alkoxylated pentaerythritol tetraacrylate (especially ethoxylated pentaerythritol tetraacrylate), di-trimethylolpropane tetraacrylate, di-pentaerythritol pentaacrylate and epoxidised soya bean oil acrylate. Polyol esters that have been found to be particularly advantageous include glycerol propoxylate triacrylate, trimethylolpropane triacrylate, polyalkoxylated pentaerythritol tetraacrylate, epoxidised soya bean oil acrylate and combinations thereof. In one embodiment, the polyol ester is selected from ethoxylated pentaerythritol tetraacrylate, epoxidised soya bean oil acrylate and a combination thereof.

The one or more polyol ester compounds having at least one (meth)acrylate group may include a polyol ester compound having only one (meth)acrylate group and, for example, no other ethylenically unsaturated groups. The use of such polyol esters will result in a proportion of the polyamide chains of the resin that terminate in a group derived from such polyol esters that do not include a (meth)acrylate or other such group that does not participate in a free radical-curing reaction. The use of a high proportion, for example 50 mol % or more, of polyol ester compounds having only one (meth)acrylate group and in particular compounds having only one (meth)acrylate group and no further ethylenically unsaturated groups, may result in significant quantities of passive resin that are not radiation-curable. Such resins can be present in ink and coating formulations of the invention, for example, to provide materials which act primarily as dispersants or flow aids.

The resin is typically the product of a Michael addition of the terminal amine group of the amine-terminated aminoamide thermoplastic polymer with the (meth)acrylate double bond of the polyol ester compound having at least one (meth)acrylate group. Preferably, this is the reaction of a secondary amine group, for example from a piperazine terminal group, with an excess of acrylate monomer, for example a polyol ester with an acrylate functionality of at least 3. The Michael reaction between the polyamide and the polyol ester is a well known reaction and may be carried out under well known conditions. The Michael addition reaction will often take place readily at ambient temperature; however, it is often desirable to use an elevated temperature of from about 30 to about 100° C., for example, around 60° C. The excess of acrylate ester compounds is simply a stoichiometric excess so that all the amine groups in the polyamide are reacted and each of the acrylate molecules reacts only once. This has been found to prevent significant molecular weight build or cross-linking. Advantageously, the ratio of the initial (meth)acrylate groups to the initial amine functional groups of the polyamide intermediate is a least about 4:1, preferably at least about 8:1, but preferably no more than about 30:1. In a further embodiment the ratio of the initial (meth)acrylate groups to the initial amine functional groups of the polyamide intermediate is a least about 8:1 and no more than about 20:1, preferably greater than about 8:1 and no more than about 15:1.

The amine-terminated aminoamide thermoplastic polymer advantageously has an acid number of less than about 6 mgKOH/g, preferably less than about 5 mgKOH/g, for example less than 5.0 mgKOH/g. The amine-terminated aminoamide thermoplastic polymer advantageously has an amine number of at least about 10 mgKOH/g, especially least about 20 mgKOH/g and preferably at least about 30 mgKOH/g. The amine-terminated aminoamide thermoplastic polymer advantageously has an amine number of no more than about 80 mgKOH/g, preferably no more than about 70 mgKOH/g. In one embodiment, amine-terminated aminoamide thermoplastic polymer advantageously has an amine number of from about 40 mgKOH/g, to about 60 mgKOH/g. In another embodiment, the aminoamide thermoplastic polymer has an amine number of from about 45 to about 55 mgKOH/g, for example about 50 mgKOH/g. The amounts of amine and carboxylic acid used should be so chosen as to achieve a product having such an amine number. If necessary, the progress of the reaction may be monitored, as is well known in the art, so as to enable the reaction to be terminated when the required amine number has been achieved. The amine number may be higher or lower than the ranges specified above in some embodiments depending on the level of amine excess used. In contrast to many known polyamides, the amine-terminated aminoamide thermoplastic polymer of the invention has a relatively high amine number, for example an amine number of at least 20. Such polymers can advantageously be reacted further, for example with a polyol ester that includes at least one (meth)acrylate group, thereby enabling further functional groups to be incorporated into the aminoamide polymer, such as functional groups that react in free radical curing reactions, and the properties of the polyamide to be modified. Commercially available polyamide typically have both acid and amine values of below 6 mg KOH/g and therefore lack amine groups that can be reacted further to enable the properties and functionality of the polyamide to be modified. For example, Versamid™ 335, a thermoplastic polyamide resin available from Cognis is specified to have a maximum amine number of 6 mg KOH/g. An amine excess is necessary to produce an amine-terminated aminoamide thermoplastic polymer and should preferably be in the range of from about 1.2:1 to about 1.6:1, typically about 1.3:1, compared to the combined carboxylic acid and epoxy equivalent content.

In one embodiment, the molecular weight limiting compound is a monofunctional $C_2$-$C_{22}$ fatty acid, for example, a $C_6$-$C_{18}$ fatty acid. In one embodiment, the fatty acid is partially unsaturated and, for example includes one, two or three carbon-carbon double bonds. The monofunctional carboxylic acid is typically present at a level of 5 to 15 mol percent in an aminoamide thermoplastic polymer forming reaction to control the molecular weight of the aminoamide thermoplastic polymer. Examples of suitable acids include lauric acid, linseed oil fatty acid, tall oil fatty acid, pelargonic acid, octanoic acid, coconut oil fatty acid, soya bean oil fatty acid, olive oil fatty acid, peanut oil fatty acid, cottonseed oil fatty acid, capric acid, myristic acid, palmitic acid, stearic acid, palmitoleic acid, oleic acid, linoleic acid, linolenic acid, eleostearic acid, ricinoleic acid, hexanoic acid or a mixture of any two or more thereof. In one embodiment, the monofunctional carboxylic acid is linoleic acid. In another embodiment the monofunctional carboxylic acid is octanoic or stearic acid.

The monofunctional acid advantageously provides from about 1 to about 25% of the acid functionality in the amine-terminated aminoamide thermoplastic polymer. Preferably, the monofunctional acid provides from about 3 to about 20%, more preferably from about 4.5 to about 15%, of that functionality. If the difunctional acid contains any monofunctional acids, those are not counted towards the amount of 1-25, 3-20 or 4.5-20, respectively. The inclusion of the monofunctional acid can have a significant effect on the viscosity of the final product, and, as is well known in the art, it is important to maintain a careful control over the viscosity of printing inks and coatings. Thus, although the ranges specified are appropriate in general, for any specific formulation, it may be necessary to select the amount of fatty acid from a narrower range. For example, when the acrylate is trifunctional glycerol propoxylate triacrylate (GPTA), more than 10% of acid functionality from a monofunctional fatty acid gives, in some embodiments, a final polyamide acrylate with an unacceptably low viscosity. Conversely, when the acrylate is tetrafunctional polyalkoxylated pentaerythritol tetraacrylate (PPTTA) anything less than 15% of acid functionality from a fatty acid gives, in some embodiments, a final polyamide acrylate with an unacceptably high viscosity.

In a further embodiment, the molecular weight limiting compound is a monofunctional glycidyl ether such as 2,3-epoxypropyl neodecanoate (CARDURA E 10P ex Hexion) or a mono functional amine such as stearyl amine to provide the same molecular weight limiting effect.

In one embodiment, the difunctional carboxylic acid is a dimerised fatty acid, such as Pripol 1013 from Uniqema. Other suitable difunctional carboxylic acids include di-basic acids such as adipic acid. Use of a tribasic acid instead of or in addition to the difunctional carboxylic acid is possible but the molecular weight and degree of branching of the polymer will be affected. Advantageously, tri- or higher functional acid provides no more than about 25%, preferably no more than about 2% of the acid functionality in the amine-terminated aminoamide thermoplastic polymer. In one embodiment, the amine-terminated aminoamide thermoplastic polymer is the reaction product of: an epoxylated aromatic polyol; a difunctional carboxylic acid; a trifunctional carboxylic acid; one or more multifunctional amines having at least two amine groups; and optionally, a molecular weight limiting compound selected from a monofunctional $C_2$-$C_{22}$ fatty acid, a monofunctional glycidyl ether or monofunctional amine.

In one embodiment, the resin of the first invention has a viscosity of less than about 120 Pa·s at about 50° C., especially, less than about 100 Pa·s at about 50° C., for example less than about 80 Pa·s at about 50° C.

The radiation-curable composition of the second aspect of the invention, for example the radiation-curable ink, coating or adhesive composition, includes at least one radiation-curable component. Said radiation-curable component(s) may include a radiation-curable resin of the first aspect of the invention. Alternatively or additionally, the radiation-curable composition of the second aspect of the invention may comprise a passive resin of the first aspect of the invention. Advantageously, the radiation-curable composition of the second aspect of the invention is a free radical-curable composition. Advantageously the composition of the second aspect of the invention comprises a photoinitiator, for example a free radical photoinitiator.

In one embodiment, the radiation-curable composition of the second aspect of the invention further comprises a radiation-curable monomer and/or oligomer, for example an ethylenically unsaturated monomer or oligomer, such as an acrylate monomer or oligomer. Examples of suitable acrylate oligomers include aliphatic or aromatic urethane acrylates, polyether acrylates, polyester acrylates and epoxy acrylates (such as bisphenol A epoxy acrylate). Examples of suitable acrylate monomers include hexanediol diacrylate, trimethylolpropane triacrylate, di-trimethylolpropane tetraacrylate, di-pentaerythritol pentaacrylate, polyether acrylates, such as ethoxylated trimethylol propane triacrylate, glycerol propoxylate triacrylate, ethoxylated pentaerythritol tetraacrylate, and epoxy acrylates such as dianol diacrylate the diacrylate of 2,2-bis[4-(2-hydroxyethoxy)phenyl]propane, Ebecryl 150 from UCB) and glycol diacrylates such as tripropylene glycol diacrylate. The acrylate monomer may, optionally, be an ethoxylated monomer, for example, an epoxidised soya bean oil acrylate monomer.

In one embodiment, the composition of the second aspect of the invention is an ink or coating composition. In one embodiment of the second aspect of the invention, when about 1 $cm^3$ of the ink or coating composition is placed on a perpendicular metal flow plate at about 25° C., the furthest distance flowed by the composition after 15 minutes is at least 3 cm. In a further embodiment the furthest distance flowed by the composition after 15 minutes is no more than about 20 cm. In a yet further embodiment the furthest distance flowed by the composition after 15 minutes is no more than about 15 cm, for example no more than about 10 cm. An ink or coating having a flow distance of from 3 cm to 10 cm has been found to be particularly suited for application using an offset printing technique. In one embodiment, the ink or coating is yellow or black.

In one embodiment of the third aspect of the invention, there is provided a yellow or black printing ink or coating composition, wherein when about 1 $cm^3$ of the composition is placed on a perpendicular metal flow plate at about 25° C., the furthest distance flowed by the composition after 15 minutes is no more than about 15 cm, for example no more than about 10 cm.

In one embodiment of the third aspect of the invention, the polyamide acrylate oligomer comprises a novolac or bisphenol segment. In a further embodiment, the ink or coating of the third aspect of the invention comprises a resin of the first aspect of the invention.

In one embodiment, the invention provides a radiation-curable ink or coating composition of the second or third aspects of the invention which is an offset, flexographic (flexo) screen or ink jet ink or coating. In a further embodiment the ink or coating composition is an offset or flexo ink or coating, especially an offset ink or coating. In a yet further embodiment, the ink or coating composition has a viscosity of no more than 100 Pa·s at about 50° C.

In one embodiment the radiation-curable composition of the second aspect of the invention is an adhesive, for example, a laminating adhesive. The adhesive composition of the invention is advantageously a shelf-stable composition that is cured only on exposure to radiation, preferably actinic radiation, especially UV radiation.

In one embodiment, the a radiation-curable composition of the second aspect of the invention or the ink or coating composition of the third aspect of the invention is curable on exposure to actinic radiation, in particular UV radiation. In one embodiment of the fifth aspect of the invention, the ink or coating composition is cured on exposure to actinic radiation, in particular UV radiation. In one embodiment of the seventh aspect of the invention the adhesive is cured on exposure to actinic radiation, in particular UV radiation. The radiation-curable ink, coatings or adhesives of the invention are preferably free radical curable inks, coatings or adhesives that harden via a free radical-mediated curing reaction.

The ink, coating or adhesive composition of the present invention, for example, the ink or coating of the second or third aspects of the invention, advantageously comprises at least a photoinitiator and a resin of the present invention. In one embodiment, the composition comprises a radiation-curable resin of the invention and also, optionally, a passive resin of the invention. Suitable initiators are well known in the art, and there is no particular restriction on the choice of initiator for use in the present invention. Typically, a blend of several photoinitiators and an amine synergist are used to achieve the desired balance of product properties. Advantageously, the photoinitiator is a free-radical photoinitiator that generates free radicals on exposure to actinic radiation, in particular UV radiation. The photoinitiators may be of either the cleavage or hydrogen abstraction type and may, for example, be selected from the following photoinitiator classes: benzophenones, thioxanthones, hydroxyalkylphenones, aminoalkylphenones, anthraquinones, acyl phosphine oxides, bis-acyl phosphine oxides, benzil ketals, benzoin ethers, acetophenones, beta ketosulphones, oxime esters and phenyl glyoxic acid esters. The amine synergists are typically selected from the classes of aliphatic amines, aminoacrylates or esters of 4-dimethylaminobenzoic acid. Sensitisers such as Michler's ketone or its analogues may also be used. Further examples of photoinitiators, synergists and sensitisers can be found in standard textbooks such as "Chemistry & Technology of UV & EB Formulation for Coatings, Inks & Paints", Volume III, "Photoinitiators for Free Radical Cationic and Anionic Polymerisation", 2<nd> edition, by J. V. Crivello & K. Dietliker, edited by G. Bradley and published in 1998 by John Wiley & Sons in association with SITA Technology Limited; and "Exploring the Science, Technology and Applications of UV and EB Curing", R. S. Davidson, SITA Technology Ltd., London, 1999, the disclosures of which are incorporated herein by reference.

In addition, the radiation-curable composition of the invention may optionally contain any one or more of other well known materials which are commonly incorporated into such compositions to provide particular desired properties either in the curable composition or in the final cured product, and, in particular, will normally contain a pigment or other colorant. In the context of the present invention, the term 'colorant' covers both materials which endow an actual visual colour and/or another optical property such as fluorescence. Colorants are typically included in amounts of about 20% of total colorant(s) by weight of the total composition. Broadly speaking, colorants may be considered as falling into two classes, namely dyes, which are substantially soluble in the ink composition, and pigments, which are dispersed in the ink composition in the form of fine particles, if necessary with the aid of a suitable dispersant. Pigments may be selected from a wide range of classes, for example, Pigment Red 57:1, Pigment Red 52:2, Pigment Red 48:2, Pigment Blue 15:3, Pigment Green 7, Pigment Yellow 83, Pigment Yellow 13, Pigment White 6, Pigment Black 7. A non-exhaustive list of examples of such pigments include the following from the Irgalite range ex CIBA: Rubine L4, Bordeaux CM, Red 2BP, Blue LG, Green GLN, Yellow B3R and yellow LBG; as well as Tioxide RHD6 (ex Tioxide) and Special Black 250 (ex Degussa). Other examples of suitable pigments are given in "Printing Ink Manual", fourth edition, Leach R. H. et al. (eds.), Van Nostrand Reinhold, Wokingham, (1988), the disclosure of which is incorporated herein by reference.

In one embodiment, the radiation-curable ink or coating of the second or third aspect of the invention comprises a diarylide yellow pigment or a carbon black pigment, for example, CI pigment yellow 13 (diarylamide AAMX) or CI pigment black 7 (No. 77266), such as Furnace black. Formulating a yellow or black ink or coating, particularly a yellow or black ink containing the above yellow or black pigments that displays good flow characteristics has previously been particularly challenging. However, it has been found that examples of yellow and black inks and coatings including the resins of the present invention have acceptable flow characteristics.

Radiation-curable compositions according to the present invention optionally may also optionally comprise one or more minor ingredients, for example, surfactants, leveling additives, photoinitiator stabilisers, wetting agents and pigment stabilisers. The latter may for example be of polyester, polyurethane or polyacrylate types, especially in the form of high molecular weight block co-polymers, and would typically be incorporated at from 2.5% to 100% by weight of the pigment. Suitable examples are Disperbyk 161 or 162 (ex BYK Chemie) or Solsperse ex Zeneca. Suitable photoinitiator stabilisers include those disclosed in EP-A-0 465 039.

Suitable surfactants are preferably of the non-ionic type, for example Fluorad FC430 (ex 3M Corp.). Such surfactants (when present) are preferably included in an amount of 0.1% to 10% by weight of the total composition.

The amount of the resin of the invention used in the radiation-curable compositions of the present invention may vary over a wide range, as is well known in the art. Typically, the amount of radiation-curable resin will be between about 15 and about 70 wt %, more preferably from about 20 to about 60 wt %, and most preferably about 25 to about 45 wt %. Typically, the amount of passive resin will be between about 1 and about 40 wt %, more preferably from about 2 to about 30 wt %, and most preferably about 5 to about 20 wt %. The application and curing of the compositions of the present invention may be carried out using techniques well known to those skilled in the art, for example, as described in "Printing Ink Manual", fourth edition, referred to above.

In one embodiment of the fifth aspect of the invention, the ink or coating composition is applied by a flexographic, screen, ink jet or offset printing technique. In a further embodiment the ink or coating is applied using a flexographic or offset printing technique, especially an offset printing technique.

In one embodiment of the sixth aspect of the invention, the molar ratio of acrylate functional groups to amine functional groups in the reaction is at least 4:1.

In one embodiment of the sixth aspect of the invention, the method comprises the additional step of preparing the amine-terminated aminoamide thermoplastic polymer including the step of combining in a reaction mixture: the epoxylated aromatic polyol; the multifunctional carboxylic acid having at least two carboxylic acid groups; the diamine; and, optionally, the molecular weight limiting compound selected from a monofunctional $C_2$-$C_{22}$ fatty acid, a monofunctional diglycidyl ether or monofunctional amine. In one embodiment, the molar ratio of amine groups to the combined carboxylic acid and epoxide groups in the reaction mixture, is in the range of from 1.2:1 to 1.6:1. In a further embodiment the reaction mixture is heated to an elevated temperature of greater than about 100° C. In one embodiment, the molecular weight limiting compound is present at a level of from 5 to 15 mol % in the reaction mixture.

In one aspect of the seventh aspect of the invention the composition is cured on exposure to actinic radiation, for example UV radiation.

In one embodiment of the eighth aspect of the invention, the first article adhered to a second article by a cured layer of a radiation-curable adhesive composition of the second aspect of the invention.

In one aspect, the invention provides UV or EB curable oligomers prepared by the reaction of bisphenol F, epoxy novolac or epoxy cresol Novolac compounds with a difunctional carboxylic acid, a monofunctional carboxylic acid and an excess of a difunctional secondary amine. The resultant secondary amine terminated oligomer can then be reacted with a multifunctional acrylate monomer via the Michael addition reaction to give a new class of resin useful in UV and EB curable inks and coatings for printing ink applications. In a further aspect, the invention provides a radiation curable Novolac modified aminoamide acrylate resin which is the Michael addition product of a Novolac aminoamide thermoplastic polymer with one or more polyol ester compounds having at least one (meth)acrylate group. A series of novolac or bisphenol F modified aminoamide acrylate polymers are described herein that are useful for radiation curable printing inks. The incorporation of a Novolac or bisphenol F core to the molecule provides increased hardness and improved ink flow over known acrylate modified amino amide polymers.

The oligomers of one aspect of the invention can be represented by the generic structure;

oligomer structure above then the epoxy novolac is bisphenol F diglycidyl ether. As described on page 3, column 3 of the Dow Chemical technical brochure "Dow Epoxy Novolac Resins". Note: Although D.E.R. 354 is a bisphenol-F based resin, it is generally grouped with the D.E.N. resins due its highly similar molecular structure and performance in cured systems.

In another aspect, the invention provides UV or EB curable oligomers prepared by the reaction of bisphenol A epoxy compounds with a difunctional carboxylic acid, a monofunctional carboxylic acid and an excess of a difunctional secondary amine. The resultant secondary amine terminated oligomer can then be reacted with a multifunctional acrylate monomer via the Michael addition reaction to give a new class of oligomers useful as resins in printing ink applications including UV and EB curable inks and coatings. In a further aspect, the invention provides a radiation curable bisphenol A epoxy modified aminoamide acrylate resin which is the Michael addition product of an epoxy aminoamide thermoplastic polymer with one or more polyol ester compounds having at least one (meth)acrylate group. A series of bisphenol modified aminoamide acrylate polymers are described

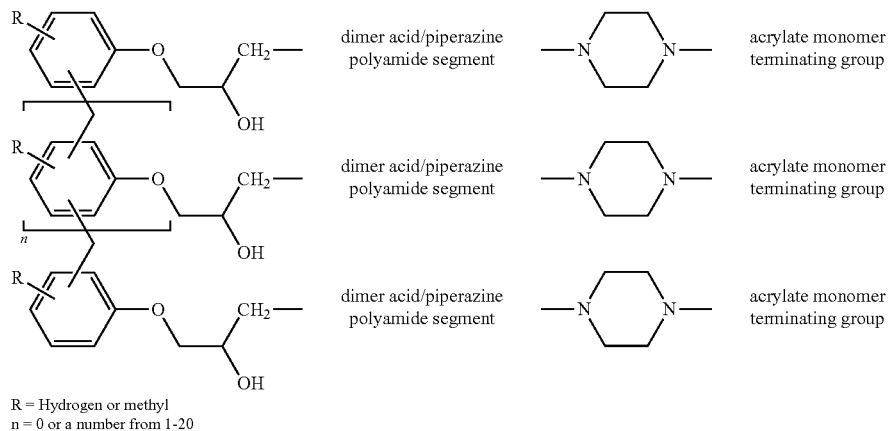

R = Hydrogen or methyl
n = 0 or a number from 1-20

The ethoxylated aromatic polyols used in this aspect of the invention are typically a low molecular weight epoxy novolac raw material such as D.E.N. 431 from Dow Chemical at a level of 5-15 mol percent to replace carboxylic acid groups. Neither the molecular weight nor the extent of the modification is limiting, and higher modification levels would be expected to provide further enhanced ink flow properties. Where R=a hydrogen and the repeat unit value=zero in the herein that are useful for radiation curable printing inks. The incorporation of a bisphenol A core to the molecule provides increased hardness and a notable improvement in ink flow properties over known acrylate modified amino amide polymers.

The oligomers of one aspect of the invention can be represented by the generic structure:

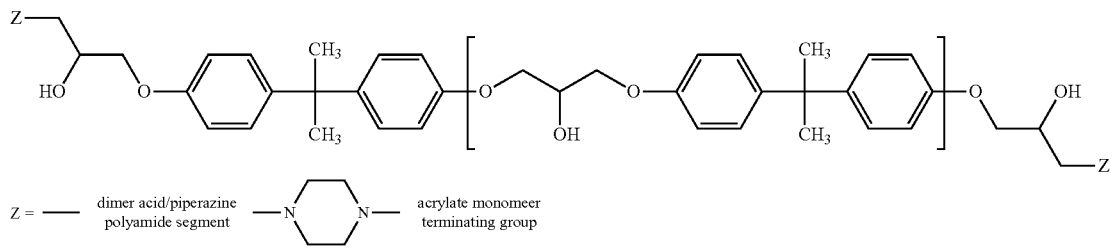

The ethoxylated aromatic polyols used in this aspect of the invention are typically low molecular weight bisphenol A type raw materials such as D.E.R. 331 from Dow Chemical at a level of 5-15 mol percent to replace carboxylic acid groups. Neither the molecular weight of the epoxy compound nor the extent of the modification is limiting.

Typically, the above oligomers are prepared by charging the individual components to a round bottom flange flask and slowly heating to an elevated temperature, such as for example 120° C. with stirring. During this time the epoxy groups will react with the amine excess. As the temperature is increased further, such as for example to 190° the well-known reaction between the carboxylic acid and amine takes place forming water which is removed by distillation. The reaction is preferably done in the absence of any solvent but suitable solvents include aromatic hydrocarbons such as xylene, toluene etc. which would aid the removal of water via an azeotrope. There is no particular restriction on the reaction temperature: however, the reaction is preferably carried out at a temperature greater than 100° C. so as to remove the water formed during the reaction. The progress of the reaction may be monitored by the amine number and acid number, as is well-known in the art.

EXAMPLES

General Methods

Viscosity measurements throughout the application were taken using a Bohlin VOR controlled stress rheometer at the temperature indicated.

Amine values throughout the application were determined using a wet chemical titration method. The sample material was dissolved in methyl ethyl ketone and titrated using 0.1 M aqueous hydrochloric acid and a bromo cresol green indicator.

Acid values throughout the application were determined using a wet chemical titration method. The sample material was dissolved in methyl ethyl ketone and titrated using 0.1M methanolic potassium hydroxide and a phenolphthalein indicator.

Molecular weight results throughout the application were measured using Gel Permeation Chromatography (GPC). 2× Polymer Labs "Mixed Bed C" 5 micron pore size columns were used with a 1 ml/min tetrahydrofuran (THF) mobile phase, 1% wt sample concentration and a refractive index detector. Mw values were determined against a series of polystyrene reference standards.

All inks were pre-mixed by hand and then given 3 passes over a 3-roll mill.

The examples below describe preparation of oligomers and the preparation/testing of these in UV curable inks. These examples are provided for illustrative purposes only and should not be construed as limiting.

Example 1

17.5 g, 0.1 equivalents epoxy novolac (DEN 431 ex Dow Chemical Company), 224 g, 0.8 equivalents dimer acid (Pripol 1013 ex Uniqema), 28.0 g, 0.1 equivalents linoleic acid and 55.9 g, 1.3 equivalents piperazine were charged to a reaction vessel and heated slowly to 120° C. and held at this temperature for 1 hour until the epoxy/amine reaction had completed. The flask contents were heated to 190° C., distilling out the evolved water under a nitrogen purge until an acid value of <5 mgKOH/g was achieved. The product was discharged as a viscous straw coloured resin. Viscosity=Pa·s 53.7 at 50° C. Amine value 49.6 mgKOH/g. Acid value 4.3 mgKOH/g. Molecular weight by GPC Mw=5085.

Example 2

55.3 g, 0.049 equivalents of the material made in Example 1, 51.7 g, 0.39 equivalents alkoxylated pentaerythritol tetraacrylate (SR494 ex Sartomer), 93.0 g, 0.042 equivalents epoxidised soya bean oil acrylate (Photomer 3005 F ex Cognis) and 0.2 g butylated hydroxy toluene were charged to a reaction vessel and heated with stirring to 60° C. and held at this temperature for 2 hours. The product was discharged as a viscous straw coloured resin. Viscosity=Pa·s 50.9 at 25° C.

Example 3

69.2 g, 0.061 equivalents of Example 1, 72.7 g, 0.55 equivalents alkoxylated pentaerythritol tetraacrylate (SR494 ex Sartomer), 58.1 g, 0.026 equivalents epoxidised soya bean oil acrylate (Photomer 3005 F ex Cognis) and 0.2 g butylated hydroxy toluene were charged to a reaction vessel and heated with stirring to 60° C. and held at this temperature for 2 hours. The product was discharged as a viscous straw coloured resin. Viscosity=37 Pa·s at 30° C.

Example 4

80.5 g, 0.075 equivalents of Example 1, 119.5 g, 0.75 equivalents glycol propoxylated triacrylate (OTA 480 ex Cytec), and 0.2 g butylated hydroxy toluene were charged to a reaction vessel and heated with stirring to 60° C. and held at this temperature for 2 hours. The product was discharged as a viscous straw coloured resin. Viscosity=7.3 Pa·s at 30° C.

Example 5

50.6 g, 0.047 equivalents of Example 1, 60.1 g, 0.38 equivalents glycol propoxylated triacrylate (OTA 480 ex Cytec), 89.3 g, 0.041 equivalents epoxidised soya bean oil acrylate (Photomer 3005 F ex Cognis) and 0.2 g butylated hydroxy toluene were charged to a reaction vessel and heated with stirring to 60° C. and held at this temperature for 2 hours. The product was discharged as a viscous straw coloured resin. Viscosity=16 Pa·s at 30° C.

Example 6

26.25 g, 0.15 equivalents epoxy novolac (DEN 431 ex Dow Chemical Company), 210 g, 0.75 equivalents dimer acid (Pripol 1013 ex Uniqema), 28.0 g 0.1 equivalents linoleic acid and 55.9 g 1.3 equivalents piperazine were charged to a reaction vessel and heated slowly to 120° C. and held at this temperature for 1 hour until the epoxy/amine reaction had completed. The flask contents were heated to 190° C., distilling out the evolved water under a nitrogen purge until an acid value of <5 mgKOH/g was achieved. The product was discharged as a viscous straw coloured resin. Viscosity=76 Pa·s at 50° C. Amine value 56.9 mgKOH/g. Acid value 3.9 mgKOH/g. Molecular weight by GPC Mw=5485.

Example 7

50.0 g, 0.051 equivalents of Example 6, 53.6 g, 0.41 equivalents alkoxylated pentaerythritol tetraacrylate (SR494 ex Sartomer), 96.4 g, 0.044 equivalents epoxidised soya bean oil acrylate (Photomer 3005 F ex Cognis) and 0.2 g butylated hydroxy toluene were charged to a reaction vessel and heated with stirring to 60° C. and held at this temperature for 2 hours. The product was discharged as a viscous straw coloured resin. Viscosity=27 Pa·s at 30° C.

Example 8

8.75 g, 0.05 equivalents, epoxy novolac (DEN 431 ex Dow Chemical Company), 238 g, 0.85 equivalents, dimer acid (Pripol 1013 ex Uniqema), 28.0 g, 0.1 equivalents, linoleic acid and 55.9 g, 1.3 equivalents piperazine, were charged to a reaction vessel and heated slowly to 120° C. and held at this temperature for 1 hour until the epoxy/amine reaction had completed. The flask contents were heated to 190° C., distilling out the evolved water under a nitrogen purge until an acid value of <5 mgKOH/g was achieved. The product was discharged as a viscous straw coloured resin. Viscosity=51 Pa·s at 50° C. Amine value 52.6 mgKOH/g. Acid value 4.2 mgKOH/g. Molecular weight by GPC Mw=4125.

Example 9

53.0 g, 0.050 equivalents of Example 8, 52.5 g, 0.40 equivalents alkoxylated pentaerythritol tetraacrylate (SR494 ex Sartomer), 94.5 g, 0.043 equivalents epoxidised soya bean oil acrylate (Photomer 3005 F ex Cognis) and 0.2 g butylated hydroxy toluene were charged to a reaction vessel and heated with stirring to 60° C. and held at this temperature for 2 hours. The product was discharged as a viscous straw coloured resin. Viscosity=24 Pa·s at 30° C.

Example 10

15.7 g 0.1 equivalents poly[(phenyl glycidyl ether]-co-formaldehyde]epoxy novolac resin (345 molecular weight grade ex Sigma-Aldrich), 224 g 0.8 equivalents dimer acid (Pripol 1013 ex Uniqema), 28.0 g 0.1 equivalents linoleic acid and 55.9 g 1.3 equivalents piperazine were charged to a reaction vessel and heated slowly to 120° C. and held at this temperature for 1 hour until the epoxy/amine reaction had completed. The flask contents were heated to 190° C., distilling out the evolved water under a nitrogen purge until an acid value of <5 mgKOH/g was achieved. The product was discharged as a viscous straw coloured resin. Viscosity=49 Pa·s at 50° C. Amine value 57.0 mgKOH/g. Acid value 4.2 mgKOH/g. Molecular weight by GPC Mw=4330.

Example 11

50.0 g, 0.058 equivalents of Example 8, 53.6 g, 0.41 equivalents alkoxylated pentaerythritol tetraacrylate (SR494 ex Sartomer), 96.4 g, 0.044 equivalents epoxidised soya bean oil acrylate (Photomer 3005 F ex Cognis) and 0.2 g butylated hydroxy toluene were charged to a reaction vessel and heated with stirring to 60° C. and held at this temperature for 2 hours. The product was discharged as a viscous straw coloured resin. Viscosity=26 Pa·s at 30° C.

Example 12

17 g, 0.1 equivalents bisphenol F diglycidyl ether (DER 354 ex Dow Chemical Company), 224 g, 0.8 equivalents dimer acid (Pripol 1013 ex Uniqema), 28.0 g, 0.1 equivalents linoleic acid and 55.9 g, 1.3 equivalents piperazine were charged to a reaction vessel and heated to 120° C. and held at this temperature for 1 hour until the epoxy/amine reaction had completed and the rest of the amine was fixed. The flask contents were heated to 190° C., distilling out the evolved water under a nitrogen purge until an acid value of <5 mgKOH/g was achieved. The product was discharged as a viscous straw coloured resin. Viscosity=60 Pa·s at 50° C. Amine value 51.7 mgKOH/g. Acid value 4.04 mgKOH/g. Molecular weight by GPC Mw=6550.

Example 13

53.7 g, 0.049 equivalents of the material made in Example 12, 52.3 g, 0.40 equivalents alkoxylated pentaerythritol tetraacrylate (SR494 ex Sartomer), 94.0 g, 0.043 equivalents epoxidised soya bean oil acrylate (Photomer 3005 F ex Cognis) and 0.2 g butylated hydroxy toluene were charged to a reaction vessel and heated with stirring to 60° C. and held at this temperature for 2 hours. The product was discharged as a viscous straw coloured resin. Viscosity=27 Pa·s at 30° C.

Example 14

67.3 g, 0.062 equivalents of the material made in Example 12, 73.7 g, 0.56 equivalents alkoxylated pentaerythritol tetraacrylate (SR494 ex Sartomer), 59.0 g, 0.027 equivalents epoxidised soya bean oil acrylate (Photomer 3005 F ex Cognis) and 0.2 g butylated hydroxy toluene were charged to a reaction vessel and heated with stirring to 60° C. and held at this temperature for 2 hours. The product was discharged as a viscous cloudy straw coloured resin. Viscosity=28 Pa·s at 30° C.

Example 15

90.2 g, 0.083 equivalents of the material made in Example 12, 109.8 g, 0.83 equivalents alkoxylated pentaerythritol tetraacrylate (SR494 ex Sartomer), and 0.2 g butylated hydroxy toluene were charged to a reaction vessel and heated with stirring to 60° C. and held at this temperature for 2 hours. The product was discharged as a viscous cloudy straw coloured resin. Viscosity=16 Pa·s at 30° C.

Example 16

18.7 g, 0.1 equivalents bisphenol A diglycidyl ether (D.E.R 331 ex Dow Chemical Company), 224 g, 0.8 equivalents dimer acid (Pripol 1013 ex Uniqema), 14.4 g, 0.1 equivalents octanoic acid and 55.9 g, 1.3 equivalents piperazine were charged to a reaction vessel and stirred for 10 minutes, allowing to exotherm slightly as the epoxy groups react with the piperazine. The flask contents were heated slowly to 120° C. and held at this temperature for 1 hour before heating to 190° C. and distilling out the evolved water under a nitrogen purge until an acid value of <5 mgKOH/g was achieved. The product was discharged as a viscous straw coloured resin. Viscosity=490 Pa·s at 35° C. Amine value 52.4 mgKOH/g. Acid value 4.2 mgKOH/g. Molecular weight by GPC Mw=4620.

Example 17

66.7 g, 0.06 equivalents of the material made in Example 16, 74.1 g, 0.56 equivalents alkoxylated pentaerythritol tetraacrylate (SR494 ex Sartomer), 59.2 g, 0.03 equivalents epoxidised soya bean oil acrylate (Photomer 3005 F ex Cognis) and 0.2 g butylated hydroxy toluene were charged to a reaction vessel and heated slowly with stirring to 60° C. and held at this temperature for 2 hours. The product was discharged as a viscous straw coloured resin. Viscosity=53 Pa·s at 30° C.

Example 18

53.2 g, 0.05 equivalents of the material made in Example 16, 52.5 g, 0.40 equivalents alkoxylated pentaerythritol tetraacrylate (SR494 ex Sartomer), 94.4 g, 0.04 equivalents epoxidised soya bean oil acrylate (Photomer 3005 F ex Cognis) and 0.2 g butylated hydroxy toluene were charged to a reaction vessel and heated slowly with stirring to 60° C. and held at this temperature for 2 hours. The product was discharged as a viscous straw coloured resin. Viscosity=59 Pa·s at 25° C.

Example 19

37.4 g, 0.2 equivalents bisphenol A diglycidyl ether (DER 331 ex Dow Chemical Company), 196 g, 0.7 equivalents dimer acid (Pripol 1013 ex Uniqema), 14.4 g, 0.1 equivalents octanoic acid and 55.9 g, 1.3 equivalents piperazine were charged to a reaction vessel and stirred for 10 minutes, allowing to exotherm to 60° C. as the epoxy groups react with the piperazine. The flask contents were heated slowly to 120° C. and held at this temperature for 1 hour before heating to 190° C. and distilling out the evolved water under a nitrogen purge until an acid value of <5 mgKOH/g was achieved. The product was discharged as a viscous straw coloured resin. Viscosity=1300 Pa·s at 35° C. Amine value 62.9 mgKOH/g. Acid value 4.2 mgKOH/g. Molecular weight by GPC Mw=4555.

Example 20

58.9 g, 0.066 equivalents of the material made in Example 19, 78.4 g, 0.59 equivalents alkoxylated pentaerythritol tetraacrylate (SR494 ex Sartomer), 62.7 g, 0.029 equivalents epoxidised soya bean oil acrylate (Photomer 3005 F ex Cognis) and 0.2 g butylated hydroxy toluene were charged to a reaction vessel and heated slowly with stirring to 60° C. and held at this temperature for 2 hours. The product was discharged as a viscous straw coloured resin. Viscosity=30 Pa·s at 30° C.

Example 21

46.4 g, 0.05 equivalents of the material made in Example 19, 54.9 g, 0.42 equivalents alkoxylated pentaerythritol tetraacrylate (SR494 ex Sartomer), 98.8 g, 0.045 equivalents epoxidised soya bean oil acrylate (Photomer 3005 F ex Cognis) and 0.2 g butylated hydroxy toluene were charged to a reaction vessel and heated slowly with stirring to 60° C. and held at this temperature for 2 hours. The product was discharged as a viscous straw coloured resin. Viscosity=48 Pa·s at 25° C.

Example 22

18.7 g, 0.1 equivalents bisphenol A diglycidyl ether (DER 331 ex Dow Chemical Company), 224 g, 0.8 equivalents dimer acid (Pripol 1013 ex Uniqema), 28.0 g, 0.1 equivalents linoleic acid and 55.9 g, 1.3 equivalents piperazine were charged to a reaction vessel and stirred for 10 minutes, allowing to exotherm slightly as the epoxy groups react with the piperazine. The flask contents were heated slowly to 120° C. and held at this temperature for 1 hour before heating to 190° C. and distilling out the evolved water under a nitrogen purge until an acid value of <5 mgKOH/g was achieved. The product was discharged as a viscous straw coloured resin. Viscosity=235 Pa·s at 35° C. Amine value 47.0 mgKOH/g. Acid value 4.9 mgKOH/g. Molecular weight by GPC Mw=3785.

Example 23

57.5 g, 0.048 equivalents of the material made in Example 22, 50.9 g, 0.39 equivalents alkoxylated pentaerythritol tetraacrylate (SR494 ex Sartomer), 91.6 g, 0.042 equivalents epoxidised soya bean oil acrylate (Photomer 3005 F ex Cognis) and 0.2 g butylated hydroxy toluene were charged to a reaction vessel and heated slowly with stirring to 60° C. and held at this temperature for 2 hours. The product was discharged as a viscous straw coloured resin. Viscosity=58 Pa·s at 25° C.

Example 24

18.7 g, 0.1 equivalents bisphenol A diglycidyl ether (DER 331 ex Dow Chemical Company), 210 g, 0.75 equivalents dimer acid (Pripol 1013 ex Uniqema), 42.0 g, 0.15 equivalents linoleic acid and 55.9 g, 1.3 equivalents piperazine were charged to a reaction vessel and stirred for 10 minutes, allowing to exotherm slightly as the epoxy groups react with the piperazine. The flask contents were heated slowly to 120° C. and held at this temperature for 1 hour before heating to 190° C. and distilling out the evolved water under a nitrogen purge until an acid value of <5 mgKOH/g was achieved. The product was discharged as a viscous straw coloured resin. Viscosity=119 Pa·s at 35° C. Amine value 56.1 mgKOH/g. Acid value 4.6 mgKOH/g. Molecular weight by GPC Mw=3135.

Example 25

50.6 g, 0.051 equivalents of the material made in Example 24, 53.4 g, 0.40 equivalents alkoxylated pentaerythritol tetraacrylate (SR494 ex Sartomer), 96.0 g, 0.044 equivalents epoxidised soya bean oil acrylate (Photomer 3005 F ex Cognis) and 0.2 g butylated hydroxy toluene were charged to a reaction vessel and heated slowly with stirring to 60° C. and held at this temperature for 2 hours. The product was discharged as a viscous straw coloured resin. Viscosity=32 Pa·s at 25° C.

Example 26

53.0 g, 0.1 equivalents bisphenol A diglycidyl ether (DER 661 ex Dow Chemical Company), 224 g, 0.8 equivalents dimer acid (Pripol 1013 ex Uniqema), 28.0 g, 0.1 equivalents linoleic acid and 55.9 g, 1.3 equivalents piperazine were charged to a reaction vessel and heated slowly to 120° C. and held at this temperature for 1 hour until the epoxy/amine reaction had completed and the rest of the amine was fixed. The flask contents were heated to 190° C., distilling out the evolved water under a nitrogen purge until an acid value of <5 mgKOH/g was achieved. The product was discharged as a viscous straw coloured resin. Viscosity=197 Pa·s at 60° C. Amine value 48.7 mgKOH/g. Acid value 4.4 mgKOH/g. Molecular weight by GPC Mw=6665.

Example 27

56.1 g, 0.049 equivalents of the material made in Example 26, 51.4 g, 0.39 equivalents alkoxylated pentaerythritol tetraacrylate (SR494 ex Sartomer), 92.5 g, 0.042 equivalents epoxidised soya bean oil acrylate (Photomer 3005 F ex Cognis) and 0.2 g butylated hydroxy toluene were charged to a reaction vessel and heated with stirring to 60° C. and held at this temperature for 2 hours. The product was discharged as a viscous straw coloured resin. Viscosity=82 Pa·s at 25° C.

Example 28

89.5 g, 0.1 equivalents bisphenol A diglycidyl ether (DER 664 ex Dow Chemical Company), 224 g, 0.8 equivalents dimer acid (Pripol 1013 ex Uniqema), 28.0 g, 0.1 equivalents linoleic acid and 55.9 g, 1.3 equivalents piperazine were charged to a reaction vessel and heated to 120° C. and held at this temperature for 1 hour until the epoxy/amine reaction had completed and the rest of the amine was fixed. The flask contents were heated to 190° C., distilling out the evolved water under a nitrogen purge until an acid value of <5 mgKOH/g was achieved. The product was discharged as a highly viscous/gelatinous straw coloured resin. Viscosity=12.8 Pa·s at 100° C. Molecular weight by GPC Mw=27340.

Performance of Finished Inks

A series of ink formulations suitable for offset printing were prepared based on the formulations described below. These inks were tested for UV curing performance, flow and lithographic behaviour. Inks were printed onto in Incada Silk board substrate to a density of 2.35 (Black), 2.35 (Cyan) and 1.16 (Yellow) using an IGT C1 proofer which is a lab scale test press. Density was measured using an X-Rite SpectroEye Spectrophotometer.

UV Cure Testing

UV curing performance was measured by a "set-off cure test" by passing the print repeatedly (typically 2-3 passes) under a UV curing lamp and visually comparing the extent to which after each pass the ink transferred to a piece of blank substrate when placed face to face under 10 tons pressure for 5 seconds. Increased ink transfer is an indication of inferior cure and hardness. Decreased ink transfer is an indication of superior cure and hardness. Curing was done using a Fusion UV systems 300 Watts per inch microwave powered medium pressure Mercury UV lamp with a conveyor speed of 75 m/m.

Lithographic Performance Testing

Lithographic performance was evaluated using a Lithotronic (Novocontrol GmbH) instrument with Rycoline 567 fount. Performance is judged by the shape of the curve obtained and by the amount of fount uptake into the ink which should typically be in the range 20-50% for an ink to show acceptable press performance.

Ink Flow Testing

Ink flow is a critical property and is measured by the distance traveled by 1 cc of ink down a perpendicular metal flow plate after 15 minutes. This is a standard industry test that demonstrates the ability of the ink to flow in the duct of a printing press and to distribute on the rollers of the press. A flow of 2 cm or less is extremely poor making the ink difficult for the printer, a flow of more than 4 cm is desirable. Yellow and black inks are known to those skilled in the art as being difficult to formulate with good flow and formulating options to achieve this are always being sought.

Black Offset Ink Evaluation

| Material | Comp. Black ink 1 | Comp. Black ink 2 | Inventive Black ink A | Comp. black ink 3 | Comp. black ink 4 | Inventive Black ink B |
|---|---|---|---|---|---|---|
| Epoxy acrylate oligomer[1] | 11 | — | — | 11 | — | — |
| Epoxy acrylate oligomer[2] | 17 | — | — | 17 | — | — |
| Epoxy acrylate oligomer[3] | 10.5 | — | — | 10.5 | — | — |
| novolac polyamide acrylate Example 2 | — | — | 50 | — | — | — |
| Bisphenol Polyamide acrylate Example 23 | — | — | — | — | — | 50 |
| Polyamide acrylate oligomer[4] | — | 40 | — | — | 40 | — |
| Epoxidised soya bean oil acrylate oligomer[5] | — | 10 | — | — | 10 | — |
| Monomer 1[6] | 5 | — | — | 5 | — | — |
| Monomer 2[7] | 5 | — | — | 5 | — | — |
| Monomer 3[8] | 8.5 | 7 | 7 | 8.5 | 7 | 7 |
| Stabilizer[9] | 1 | 1 | 1 | 1 | 1 | 1 |
| Acrylic resin solution in monomer[10] | 10 | 10 | 10 | 10 | 10 | 10 |
| Photoinitiator blend[11] | 7.5 | 7.5 | 7.5 | 7.5 | 7.5 | 7.5 |
| Pigment 1[12] | 3.5 | 3.5 | 3.5 | 3.5 | 3.5 | 3.5 |
| Pigment 2[13] | 8 | 8 | 8 | 8 | 8 | 8 |
| Pigment 3[14] | 8 | 8 | 8 | 8 | 8 | 8 |
| Pigment 4[15] | 1 | 1 | 1 | 1 | 1 | 1 |
| Filler 1[16] | 3 | 3 | 3 | 3 | 3 | 3 |
| Wax dispersion[17] | 1 | 1 | 1 | 1 | 1 | 1 |
| Total | 100 | 100 | 100 | 100 | 100 | 100 |

[1]CN113D70 ex Sartomer
[2]Etercure 622-100 ex Eternal
[3]Photomer 3016 ex Cognis
[4]Photomer 4067F ex Cognis
[5]Photomer 3005F ex Cognis
[6]Ebecryl 140 ex Cytec
[7]Ebecryl 150 ex Cytec
[8]SR494 ex Sartomer
[9]Florstab UV1 ex kromachem
[10]Laropal A81 ex BASF in acrylate monomer
[11]Blend of Omnirad MBB, Omnipol ASA, Omnirad PBZ (ex IGM Resins), and Irgacure369 (ex CIBA) photoinitiators
[12]Sunfast Blue pigment ex Sun Pigments
[13]Raven black 1100 ex Columbian Chemicals Ltd.
[14]Raven black 1060 ex Columbian Chemicals Ltd.
[15]Irgalite magenta SMA ex CIBA
[16]Microtalc IT extra ex Norwegian Talc
[17]Radwax 65 ex kromachem Test Results

| Test | Comparative Black ink 1 | Comparative Black ink 2 | Inventive Black ink A |
|---|---|---|---|
| Flow | 3 cm | 2 cm | 12 cm |
| Lithotronic water uptake | 28% | 32% | 38% |

When printed and cured, the Black ink A was similar in cure performance to the Comparative black ink 1 which represents a typical commercial ink, and both were notably better curing than the Comparative black ink 2 which contains a commercial polyamide acrylate similar to that described in patent application WO 2007/030643. This demonstrates that the inclusion of a novolac modification into the polyamide acrylate oligomer provides additional observed cure speed to the ink as a result of increased hardness. Results also demonstrate a significant improvement in flow using the inventive example vs. comparative examples, whilst giving acceptable lithographic performance.

| Test | Comparative black ink 3 | Comparative black ink 4 | Inventive Black ink B |
|---|---|---|---|
| Flow | 3 cm | 2 cm | 5 cm |
| Lithotronic water uptake | 28% | 32% | 38% |

When printed and cured, the Black ink B was similar in cure performance to the Comparative black ink 3 which represents a typical commercial ink, and both were notably better curing than the Comparative black ink 4 which contained a commercial polyamide acrylate similar to that described in patent application WO 2007/030643. This demonstrates that the inclusion of a bisphenol A modification into the polyamide acrylate oligomer provides additional observed cure speed to the ink as a result of increased hardness. Results also demonstrate an improvement in flow using the example of this invention, whilst giving acceptable lithographic performance.

Cyan Offset Ink Evaluation

| Material | Comp. Cyan ink A | Inventive Cyan ink A | Inventive Cyan ink B | Inventive Cyan ink C | Inventive Cyan ink D |
|---|---|---|---|---|---|
| Polyamide acrylate oligomer 4[4] | 45 | — | — | — | — |
| Epoxidised soya bean oil acrylate oligomer[5] | 7.3 | 7.3 | 7.3 | 7.3 | 7.3 |
| Polyester acrylate oligomer[18] | 7.3 | — | — | — | — |
| novolac polyamide acrylate Example 2 | — | 52.3 | — | — | — |
| novolac polyamide acrylate Example 3 | — | — | 52.3 | — | — |
| novolac polyamide acrylate Example 4 | — | — | — | 52.3 | — |
| novolac polyamide acrylate Example 5 | — | — | — | — | 52.3 |
| Monomer 4[19] | 2.7 | 2.7 | 2.7 | 2.7 | 2.7 |
| Stabilizer[9] | 1 | 1 | 1 | 1 | 1 |
| Photoinitiator blend[20] | 8.7 | 8.7 | 8.7 | 8.7 | 8.7 |
| Pigment 1[12] | 19.3 | 19.3 | 19.3 | 19.3 | 19.3 |
| Filler 1[16] | 2 | 2 | 2 | 2 | 2 |
| Filler 2[21] | 3.7 | 3.7 | 3.7 | 3.7 | 3.7 |
| Filler 3[22] | 2.2 | 2.2 | 2.2 | 2.2 | 2.2 |
| Wax dispersion[17] | 0.8 | 0.8 | 0.8 | 0.8 | 0.8 |
| Total | 100 | 100 | 40.4 | 100 | 100 |

[18] Ebecryl 846 ex Cytec
[19] OTA 480 ex Cytec
[20] blend of Omnirad MBB, Omnirad EHA, Omnirad PBZ (ex IGM Resins), and Irgacure369 (ex CIBA) photoinitiators
[21] Cabosil M7D ex Cabot
[22] Socal 322 ex Solvay

| Material | Comp. cyan ink B | Inventive Cyan ink E | Inventive Cyan ink F | Inventive Cyan ink G | Inventive Cyan ink H |
|---|---|---|---|---|---|
| Epoxy polyamide acrylate Example 18 | — | 45 | — | — | — |
| Epoxy polyamide acrylate Example 21 | — | — | 45 | — | — |
| Epoxy polyamide acrylate Example 23 | — | — | — | 45 | — |
| Epoxy polyamide acrylate Example 25 | — | — | — | — | 45 |
| Polyamide acrylate oligomer[4] | 45 | — | — | — | — |
| Polyester acrylate oligomer[18] | 7.3 | 7.3 | 7.3 | 7.3 | 7.3 |

-continued

| Material | Comp. cyan ink B | Inventive Cyan ink E | Inventive Cyan ink F | Inventive Cyan ink G | Inventive Cyan ink H |
|---|---|---|---|---|---|
| Epoxidised soya bean oil acrylate oligomer[5] | 7.3 | 7.3 | 7.3 | 7.3 | 7.3 |
| Monomer 1[8] | 2.7 | 2.7 | 2.7 | 2.7 | 2.7 |
| Stabilizer[9] | 1 | 1 | 1 | 1 | 1 |
| Photoinitiator blend[26] | 8.8 | 8.8 | 8.8 | 8.8 | 8.8 |
| Cyan pigment[12] | 9.3 | 19.3 | 19.3 | 19.3 | 19.3 |
| Filler 1[16] | 2 | 2 | 2 | 2 | 2 |
| Filler 2[21] | 3.7 | 3.7 | 3.7 | 3.7 | 3.7 |
| Filler 3[22] | 2.2 | 2.2 | 2.2 | 2.2 | 2.2 |
| Wax dispersion[17] | 0.8 | 0.8 | 0.8 | 0.8 | 0.8 |
| Total | 100 | 100 | 100 | 100 | 100 |

[4]Photomer 4067F ex Cognis
[18]Ebecryl 846 ex Cytec
[5]Photomer 3005F ex Cognis
[8]SR494 ex Sartomer
[9]Florstab UV1 ex kromachem
[26]Blend of Omnirad MBB, Omnirad PBZ, Omnirad EHA (ex IGM Resins) and Irgacure 369 (ex CIBA) photoinitiators
[12]Sunfast Blue pigment ex Sun Pigments
[16]Microtalc IT extra ex Norwegian Talc
[21]Cabosil M7D ex Cabot
[22]Socal 322 ex Solvay
[17]Radwax 65 ex kromachem Test Results

| Test | Comp. Cyan ink A | Inventive Cyan ink A | Inventive Cyan ink B | Inventive Cyan ink C | Inventive Cyan ink D |
|---|---|---|---|---|---|
| Flow | 3 cm | 6 cm | 4 cm | 4 cm | 5.5 cm |
| Lithotronic water uptake | 46% | 40% | 38% | 37% | 37% |

When printed and cured, the Cyan inks C & D were slightly better curing than the comparative Cyan ink A. Cyan inks A & B were significantly better curing than the Comparative Cyan ink A which contains a commercial polyamide acrylate similar to that described in patent application WO 2007/030643. This demonstrates that the inclusion of a novolac modification into the polyamide acrylate oligomer provides additional observed cure speed to the ink as a result of increased hardness. The above results also demonstrate a significant improvement in flow using the inventive inks of this invention, (Cyan inks A, B, C & D) whilst giving acceptable lithographic performance.

| Test | Comp. cyan ink B | Inventive Cyan ink E | Inventive Cyan ink F | Inventive Cyan ink G | Inventive Cyan ink H |
|---|---|---|---|---|---|
| Flow | 2.5 cm | 3.5 cm | 4 cm | 3.5 cm | 3.5 cm |
| Lithotronic water uptake | 36% | 28% | 37% | 38% | 35% |

When printed and cured, the Cyan inks E, F, G & H were significantly better curing than the Comparative cyan ink B which contained a commercial polyamide acrylate similar to that described in patent application WO 2007/030643. This demonstrates that the inclusion of a bisphenol A modification into the polyamide acrylate oligomer provides additional observed cure speed to the ink as a result of increased hardness. The above results also demonstrated an improvement in flow using the example of this invention, whilst giving acceptable lithographic performance.

Yellow Offset Ink Evaluation

A series of yellow inks A-G we made according to the formulation below:

| Material | Comparative yellow ink | Inventive Yellow ink example |
|---|---|---|
| Polyamide acrylate oligomer[4] | 27.65 | — |
| Polyester acrylate oligomer[18] | 7 | 7 |
| Epoxidised soya bean oil acrylate oligomer[5] | 20.5 | — |
| novolac polyamide acrylate (see Example #s below) | — | 46.5 |
| Monomer 4[19] | 11 | 12.65 |
| Stabilizer[23] | 0.5 | 0.5 |
| Acrylic resin solution in monomer[10] | 6 | 6 |
| Photoinitiator blend[11] | 5.25 | 5.25 |
| Pigment 5[24] | 14.6 | 14.6 |
| Filler 1[16] | 3 | 3 |
| Filler 2[21] | 2.7 | 2.7 |
| Wax dispersion[17] | 1 | 1 |
| Transparent Orange toning ink[25] | 0.8 | 0.8 |
| Total | 100 | 100 |

[23]Genorad 18 ex Rahn
[24]Sunbrite Yellow 13 ex Sun Pigments
[25]UAV21 ex Sun Chemical

| Inventive Yellow ink examples | Novolac polyamide acrylate Example # |
|---|---|
| A | 2 |
| B | 7 |
| C | 9 |
| D | 11 |
| E | 13 |
| F | 14 |
| G | 15 |

Test Results

| Yellow ink example | Ink flow | Lithotronic water uptake |
|---|---|---|
| Comparative yellow ink | 2 cm | 40% |
| Inventive Ink A | 4 cm | 40% |
| Inventive Ink B | 6 cm | 38% |
| Inventive Ink C | 4 cm | 32% |
| Inventive Ink D | 5 cm | 35% |
| Inventive Ink E | 5 cm | 36% |
| Inventive Ink F | 5 cm | 37% |
| Inventive Ink G | 5 cm | 23% |

When printed and cured, the Yellow inks A-G were significantly better curing than the Comparative yellow ink which contained a commercial polyamide acrylate similar to that described in patent application WO 2007/030643. This demonstrates that the inclusion of a novolac modification into the polyamide acrylate oligomer provides additional observed cure speed to the ink as a result of increased hardness. Results also demonstrate a significant improvement in flow using the examples of this invention (Yellow inks A-G), whilst giving acceptable lithographic performance.

Whilst the present invention has been described and illustrated with reference to particular embodiments, it will be appreciated by those of ordinary skill in the art that the invention lends itself to many different variations not specifically illustrated herein. Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will be appreciated by the reader that integers or features of the invention that are described as preferable, advantageous, typical or the like are optional and do not limit the scope of the independent claims. It is also to be understood that features that are described as preferable, advantageous, optional, or the like with respect to certain embodiments or aspects of the invention may not be present in other embodiments or aspects of the invention.

The invention claimed is:

1. A resin, which is the Michael addition product of a secondary amine-terminated aminoamide polymer with one or more polyol ester having at least one (meth)acrylate group, wherein the secondary amine-terminated aminoamide polymer contains a bisphenol or novolac segment and wherein the resin is liquid at 25° C., wherein the secondary amine-terminated aminoamide polymer is the reaction product of:
   a. an epoxylated aromatic polyol;
   b. a difunctional carboxylic acid;
   c. one or more diamines; and
   d. optionally, a molecular weight limiting compound selected from a monofunctional $C_2$-$C_{22}$ fatty acid, a monofunctional glycidyl ether or monofunctional amine,
   said resin having a viscosity of no more than 100 Pa·s at about 50° C.

2. The resin of claim 1, wherein the epoxylated aromatic polyol is epoxy Novolac, epoxyl cresol Novolac, Bisphenol A diglycidyl ether or Bisphenol F diglycidyl ether.

3. The resin of claim 1, wherein at least one of the one or more diamines is a secondary diamine.

4. The resin of claim 1, wherein the polyol ester has at least three (meth)acrylate functional groups.

5. The resin of claim 1, wherein the polyol ester is an acrylate or methacrylate of a $C_2$-$C_{20}$ aliphatic or cycloaliphatic polyol.

6. The resin of claim 1, wherein the polyol ester is selected from glycerol propoxylate triacrylate, trimethylolpropane triacrylate, polyalkoxylated pentaerythritol tetraacrylate and epoxidised soya bean oil acrylate.

7. The resin of claim 1, wherein the amine-terminated amino amide polymer has an acid number of less than about 5 mg KOH/g.

8. The resin of claim 7, wherein the amine-terminated aminoamide polymer has an amine number of from 30 to 70 mg KOH/g.

9. resin of claim 1, having a number average molecular weight in the range of from about 2,000 to about 20,000.

10. The resin of claim 1, comprising a compound of the formula (I):

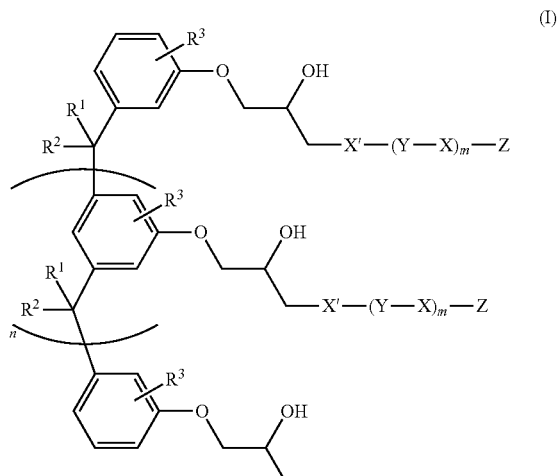

wherein

X' is a diamine unit;

(Y—X) is a polyamide in which X is a diamine unit and Y is a dicarboxy unit, wherein X and X' may be the same or different;

Z is a unit derived from a polyol ester having at least one acrylate group;

each m is independently in the range of from 0 to 10;

$R^1$, $R^2$ and $R^3$ are each independently selected from hydrogen and methyl; and n is 0 or from 1 to 20.

11. The resin of claim 10 wherein n is from 0 to 2.

12. The resin of claim 1, comprising a compound of the formula (II):

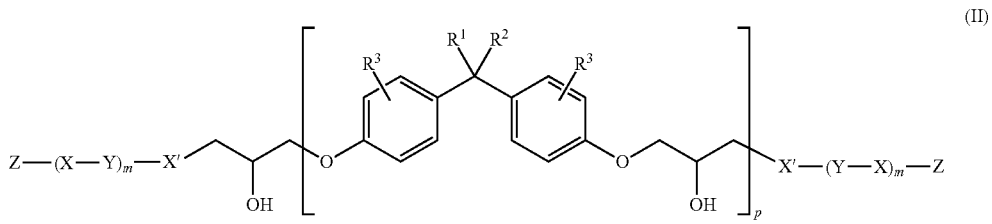

wherein
X' is a diamine unit;
(Y—X) is a polyamide, in which X is a diamine unit and Y is a dicarboxy unit, wherein X and X' may be the same or different;
Z is a unit derived from a polyol ester having at least one acrylate group;
each m is independently in the range of from 0 to 10;
$R^1$, $R^2$ and $R^3$ are each independently selected from hydrogen and methyl; and
p is from 1 to 10.

13. The resin of claim 12, wherein p is from 1 to 6.

14. The resin of claim 10, wherein $R^1$ and $R^2$ are both hydrogen.

15. The resin of claim 10, wherein each $R^3$ is hydrogen.

16. The resin of claim 10, wherein X' is a secondary diamine unit and the X is selected from a secondary diamine and a primary diamine unit.

17. A radiation-curable printing ink, coating or adhesive composition comprising the resin of claim 1.

18. The radiation-curable printing ink, coating or adhesive composition of claim 17, further comprising a free radical photo initiator.

19. The radiation-curable printing ink, coating or adhesive composition of claim 17, further comprising an ethoxylated monomer.

20. The radiation-curable printing ink, coating or adhesive composition of claim 19, further comprising an epoxidised soya bean oil acrylate monomer.

21. The radiation-curable printing ink, coating or adhesive composition of claim 17, further comprising a colorant.

22. The radiation-curable printing ink, coating or adhesive composition of claim 21, wherein the colorant is a diarylide yellow or carbon black pigment.

23. The radiation-curable printing ink coating or adhesive composition of claim 17 comprising a diarylide yellow or carbon black pigment, a polyamide acrylate oligomer, wherein the printing ink, coating or composition flows at least about 3 cm after 15 minutes when about 1 cm³ of the composition is placed on a perpendicular metal flow plate at about 25° C.

24. The radiation-curable printing ink, coating or adhesive composition of claim 23, wherein the furthest distance flowed by the composition after 15 minutes is from about 3 cm to about 10 cm.

25. The radiation-curable printing ink, coating or adhesive composition of claim 23, wherein the polyamide acrylate oligomer comprises a Novolac or Bisphenol segment.

26. A printed or coated article comprising a cured film or image of an ink or coating composition of claim 23.

27. A method of printing or coating an article comprising the steps of:
    applying an ink or coating composition including a polyamide acrylate oligomer to the article; and
    exposing the ink or coating composition to radiation to form a cured film or image,
    wherein said composition flows at least about 3 cm after 15 minutes when about 1 cm³ of the composition is placed on a perpendicular metal flow plate at about 25° C.

28. A method of preparing the resin of claim 1 by Michael addition, comprising the steps of:
    providing secondary amine-terminated amino amide polymer, wherein the secondary amine-terminated aminoamide polymer is the reaction product of:
    a. an epoxylated aromatic polyol;
    b. a difunctional carboxylic acid;
    c. one or more diamines; and
    d. optionally, a molecular weight limiting compound selected from a monofunctional $C_2$-$C_{22}$ fatty acid, a monofunctional glycidyl ether or monofunctional amine; and
    reacting the secondary amine-terminated amino amide polymer with one or more polyol ester compounds having at least one acrylate group,
    wherein the secondary amine-terminated aminoamide polymer contains a bisphenol or novolac segment and wherein the resin is liquid at 25° C.

29. The method of claim 28, wherein the molar ratio of acrylate functional groups to amine functional groups in the reaction is at least 4:1.

30. The method of claim 28, wherein the molar ratio of amine groups to the combined carboxylic acid and epoxide groups in the reaction mixture, is in the range of from about 1.2:1 to about 1.6:1.

31. The method of claim 28, wherein the molecular weight limiting compound is present at a level of from about 5 to about 15 mol % in the reaction mixture.

* * * * *